United States Patent
Yang

(10) Patent No.: US 10,775,567 B2
(45) Date of Patent: Sep. 15, 2020

(54) CONNECTOR SYSTEM

(71) Applicant: Muh-Chen Yang, Taipei (TW)

(72) Inventor: Muh-Chen Yang, Taipei (TW)

(73) Assignee: Lecca Technologies Inc., New Taipei (TW)

(*) Notice: Subject to any disclaimer, the term of this patent is extended or adjusted under 35 U.S.C. 154(b) by 0 days.

(21) Appl. No.: 16/535,532

(22) Filed: Aug. 8, 2019

(65) Prior Publication Data
US 2020/0264383 A1    Aug. 20, 2020

Related U.S. Application Data

(63) Continuation of application No. 16/524,373, filed on Jul. 29, 2019.

(60) Provisional application No. 62/807,859, filed on Feb. 20, 2019.

(30) Foreign Application Priority Data

Jun. 27, 2019    (CN) .......................... 2019 1 0567488

(51) Int. Cl.
| | |
|---|---|
| *G02B 6/38* | (2006.01) |
| *H01R 13/625* | (2006.01) |
| *H01R 13/64* | (2006.01) |
| *H01R 13/631* | (2006.01) |
| *H01R 13/622* | (2006.01) |
| *H01R 13/502* | (2006.01) |

(52) U.S. Cl.
CPC ......... *G02B 6/3825* (2013.01); *G02B 6/3849* (2013.01); *G02B 6/3869* (2013.01); *G02B 6/3879* (2013.01); *G02B 6/3891* (2013.01); *G02B 6/3897* (2013.01); *H01R 13/502* (2013.01); *H01R 13/622* (2013.01); *H01R 13/625* (2013.01); *H01R 13/6315* (2013.01); *H01R 13/64* (2013.01)

(58) Field of Classification Search
CPC .. G02B 6/3825; G02B 6/3817; G02B 6/3869; G02B 6/3879; G02B 6/3891; G02B 6/3849; G02B 6/3897; H01R 13/622; H01R 13/625; H01R 13/64; H01R 24/20; H01R 24/66; H01R 13/502; H01R 13/6315
USPC ...................................... 385/53–87
See application file for complete search history.

(56) References Cited

U.S. PATENT DOCUMENTS

| | | |
|---|---|---|
| 6,648,520 B2 | 11/2003 | McDonald et al. |
| 7,670,060 B2 | 3/2010 | Ziemke et al. |
| 8,632,351 B2 | 1/2014 | Wu |

(Continued)

FOREIGN PATENT DOCUMENTS

| | | |
|---|---|---|
| JP | 5582894 B2 | 9/2014 |
| JP | 2018-40820 A | 3/2018 |

*Primary Examiner* — Michael P Mooney
(74) *Attorney, Agent, or Firm* — Rosenberg, Klein & Lee

(57) ABSTRACT

The connector system of the present invention includes a crimp housing and a floating block. A passage extending in a longitudinal direction is formed in the crimp housing. The floating block is disposed in the passage of the crimp housing and has an interior passage extending in the longitudinal direction for receiving a back post of a connector. The floating block may make limited three-dimensional movements with respect to the crimp housing. The connectors seated in the connector system of the present invention may be independently moved with respect to each other thereby properly aligning with an adapter.

18 Claims, 32 Drawing Sheets

(56) References Cited

U.S. PATENT DOCUMENTS

| | | |
|---|---|---|
| 9,755,382 B2 | 9/2017 | Gniadek |
| 9,869,823 B1 | 1/2018 | Broughton |
| 10,114,176 B2 | 10/2018 | Gimblet et al. |
| 10,133,011 B2 | 11/2018 | Huang et al. |
| 10,197,739 B2 | 2/2019 | Ohtsuka et al. |
| 2004/0223699 A1* | 11/2004 | Melton ................ G02B 6/3869 385/53 |

* cited by examiner

CONNECTOR SYSTEM

RELATED APPLICATIONS

The present application is a continuation application of U.S. application Ser. No. 16/524,373, filed on Jul. 29, 2019, which is based on and claims priority to U.S. Provisional Application Ser. No. 62/807,859, filed on Feb. 20, 2019, and to Chinese Patent Application Number 201910567488.9, filed on Jun. 27, 2019, the disclosures of which are hereby incorporated by reference herein in their entirety.

BACKGROUND

1 Technical Field

This invention generally relates to a connector system, more particularly, to an optical fiber connector system.

2. Description of the Related Art

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption.

Referring to FIG. 1, a connector system with interchangeable connector modules for optical fibers and electrical conductors is disclosed in U.S. Pat. No. 9,755,382. The prior art US patent discloses that a connector could be engaged with an adapter 20 by a coupling nut 18, and a lock ring 26 is used to prevent the coupling nut 18 from moving longitudinally away from the coupling nut 18 thereby preventing the connector 10 from being unintentionally disengaged from the adapter 20. The lock ring 26 is operated in such a manner that it is pushed forward to abut the coupling nut 18 to prevent the coupling nut 18 from rotating after the coupling nut 18 is secured to the adapter 20.

However, the shortcoming of the above design is that a user needs to remember to push the lock ring 26 into place each time to ensure the coupling nut 18 is locked. The user will subsequently pull out the lock ring 26 to unlock. This complexity may result in user errors when installing in adverse conditions, such as outdoors or at height. The lock ring 26 should normally stay in place, but if there are problems with the lock ring or connector body dimensions, the lock ring 26 could slide out of place if the connector 10 is suspended vertically. As well, if the lock ring 26 is used in a dust cap configuration, the lock ring 26 could slide completely off the dust cap if it is suspended vertically. The lock ring 26 may also be more vulnerable to sliding if a force is applied to the dust cap. Another shortcoming of the above connector design is that there is no "click" sound or tactile feedback that indicates when the coupling nut 18 is secured in place.

Referring to FIG. 2, mating the connector 10 with the adapter in the above design requires visual inspect whether the corresponding pins on the inner walls of the connector slide into the grooves 22 on the adapter 20. This may be difficult if the user is installing the assembly in adverse conditions, such as outdoors, at height, poor light conditions or if the user needs to reach into a narrow space.

An outdoor transceiver connector is disclosed in U.S. Pat. No. 8,272,790. In this outdoor connector design, the connectors are fixed in place in the housing and they cannot be moved independently with respect to the adapter. This means that the connector housing and adapter housing must be aligned perfectly when they are mated, to avoid any loss of optical signals. Additionally, the housing extension 1304 of the connector of FIG. 2 is used to secure the connector. However, this design is not robust and if the component 1304 fails, the connector holder could be pulled out place. Also, the ferrules of the connector of FIG. 2 are exposed. If the user is installing the connector in an adverse environment, he may inadvertently touch the ends of the ferrules, leading to damage or soiling.

SUMMARY

In view of the above, the present invention provides a connector system that the connectors contained therein could be independently moved with respect to each other and therefore could be aligned properly with an adapter.

The present invention provides a connector system that the lock and unlock of the crimp housing and shroud contained therein are restricted in rotating manner.

The present invention provides a connector system that may provide tactile feedback to a user when the connector system is locked in place.

The present invention provides a connector system that may protect the fiber ferrules contained therein from direct impact.

The present invention provides a dust protector that may protect the connectors contained therein from contamination.

In one embodiment, the connector system of the present invention includes a receptacle, a shroud, a crimp housing, a first fork portion and a second fork portion. The receptacle includes a complementary indicia formed thereon. The crimp housing is disposed in the shroud for receiving a rear end of a connector. The first fork portion and the second fork portion each extend from one of the shroud and the crimp housing in a longitudinal direction. The first and second fork portions are disposed opposite to each other and configured to be inserted into the receptacle. An alignment indicia is formed on the first fork portion.

In another embodiment, the connector system of the present invention includes a shroud, a connector, a crimp housing, a first fork portion and a second fork portion. The crimp housing is disposed in the shroud to receive the rear end of the connector. The first fork portion and the second fork portion each extend from one of the shroud and the crimp housing in a longitudinal direction. The first and second fork portions are disposed opposite to each other. A notch is formed on the first fork portion. The notch divides the first fork portion into a first partial fork portion and a second partial fork portion, wherein the first partial fork portion is longer than the second partial fork portion in the longitudinal direction. A dent is formed in a corner of a front end of the second fork portion.

In still another embodiment, the connector system of the present invention includes a receptacle, a first shroud, a first crimp housing, a first fork portion, a second shroud, a second crimp housing and a second fork portion. The first crimp housing is disposed in the first shroud for receiving a rear end of a first connector. The first fork portion extends from one of the first shroud and the first crimp housing in a longitudinal direction. The first fork portion is inserted into the receptacle from a first end of the receptacle, wherein a notch is formed on the first fork portion to divide the first fork portion into a first partial fork portion and a second partial fork portion. The second crimp housing is disposed in the second shroud for receiving a rear end of a second connector. The second fork portion is inserted into the receptacle from a second end of the receptacle. The second fork portion extends from one of the second shroud and the second crimp housing toward the first fork portion, wherein a dent is formed in a corner of a front end of the second fork portion to receive a front end of the first partial fork portion of the first fork portion.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
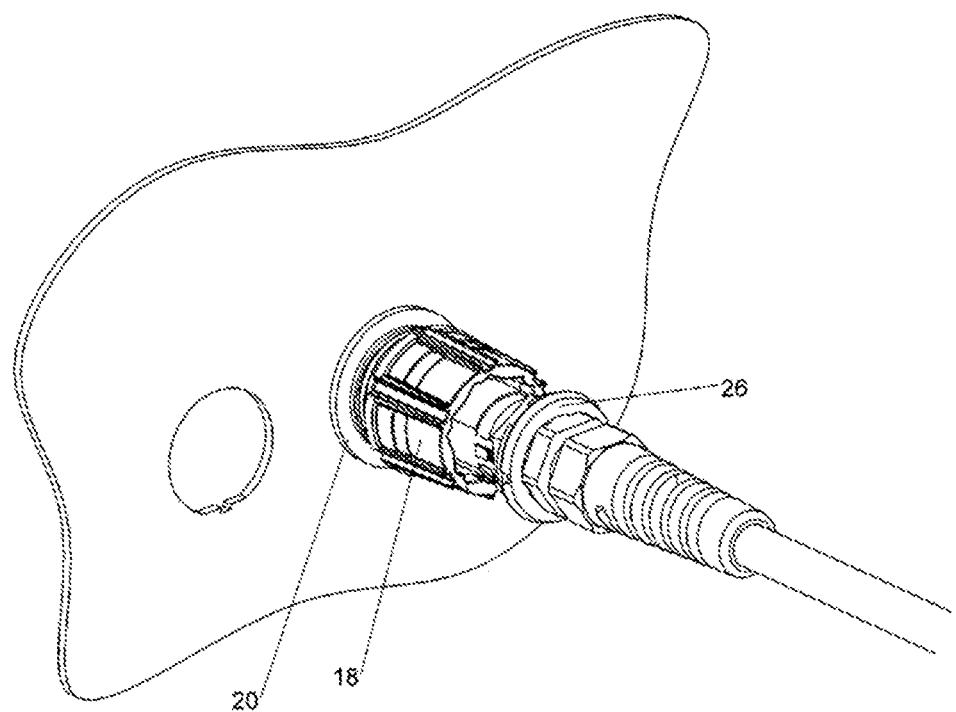
FIG. 1 illustrates a conventional connector system.
Figure 2:
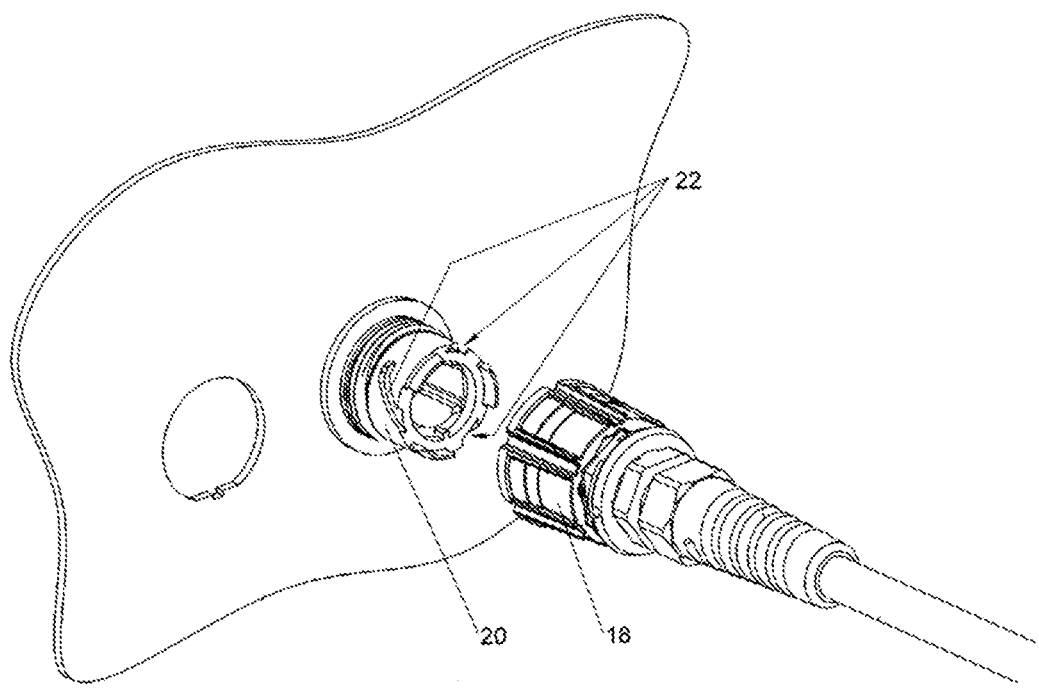
FIG. 2 illustrates how to install the connector system of FIG. 1.
Figure 3:
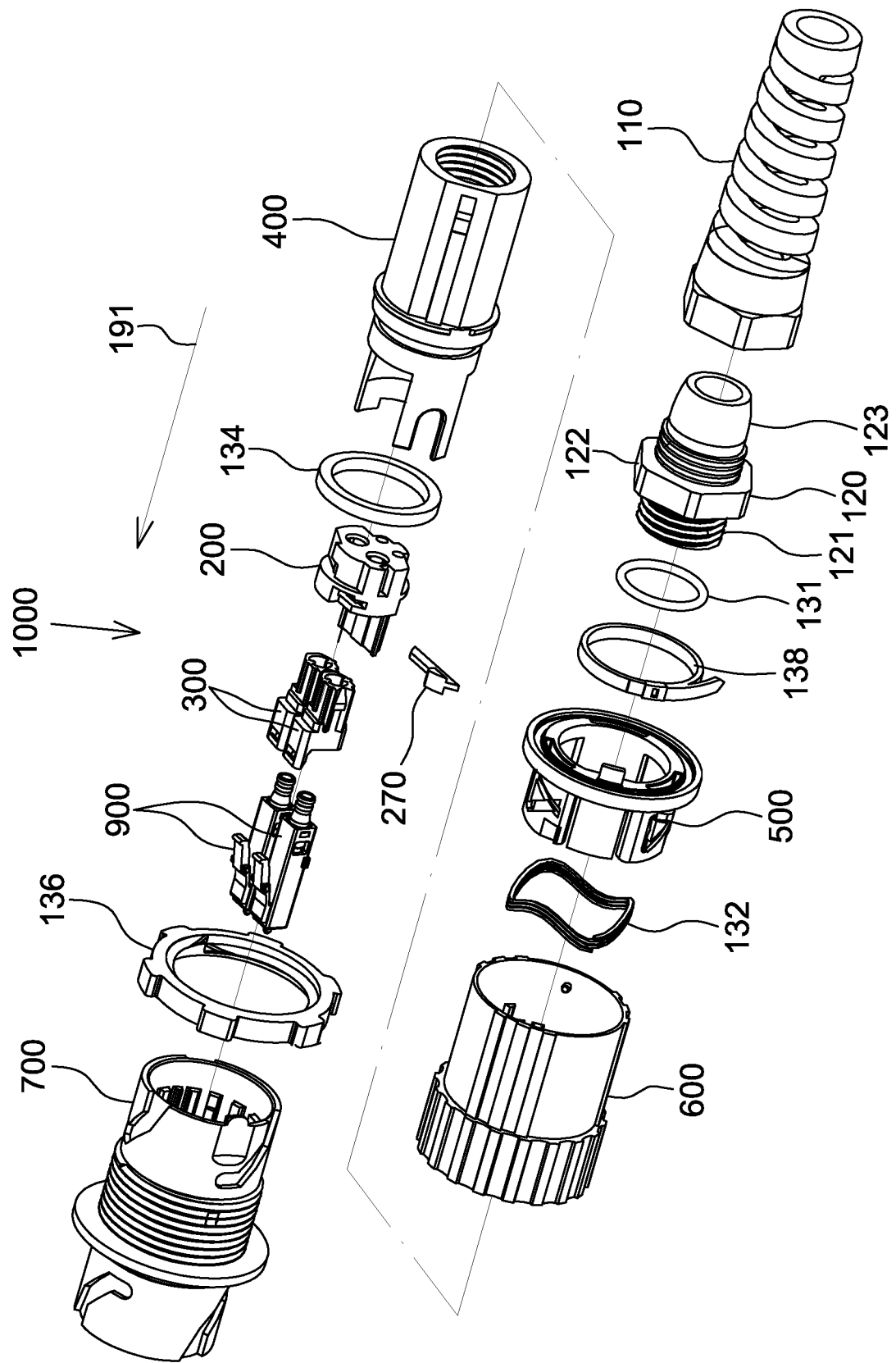
FIG. 3 is an exploded view of the connector system of the present invention.

Referring to FIG. 3, which is an exploded view of the connector system 100 of the present invention. As shown in the figure, the connector system 1000 includes a boot 110, a cable gland body 120, an O-ring 131, a wave spring 132, an O-ring 134, a nut 136, a cable tie 138, a crimp housing 200, a latch 270, floating blocks 300, a shroud 400, a sliding collar 500, a plug housing 600, a receptacle 700, and connectors 900.

The boot 110 may be made from a flexible material and provide strain relief on cable (not shown) using materials and attachment techniques as are known in the art. The boot 110 has a hollow structure whose lengthwise direction is parallel to the longitudinal direction 191. The boot 110 has a hexagonal shape at its front end. The boot 110 is formed with a thread on the inner surface thereof for being screwed to the cable gland body 120.

The cable gland body 120 is hollow and has a generally cylindrical shape whose lengthwise direction is parallel to the longitudinal direction 191. The cable gland body 120 has an interior passage extending from the rear end to the front end thereof in the longitudinal direction 191. The cable gland body 120 is generally divided into a front section 121, a middle section 122 and a rear section 123 along the longitudinal direction 191. The middle section 122 has a generally hexagonal shape and is located between the front section 121 and the rear section 123. The outer surface of the rear section 123 is formed with a thread for screwing with the thread on the inner surface of the front end of the boot 110. A thread is formed on the outer surface of the front section 121.

Referring to FIGS. 4a to 4e, the crimp housing 200 has a lengthwise direction parallel to the longitudinal direction 191. The crimp housing 200 is generally divided into a front section 210 and a rear section 220 along the longitudinal direction 191. The rear section 220 is hollow and has a generally cylindrical shape. The rear section 220 includes a front end 221, a rear end 222 and a lateral surface 223 connecting the front end 221 and the rear end 222. The rear end 222 is flat and the front end 221 is formed with a recess 224 therein.

The front section 210 extends from the front end 221 of the rear section 220 in the longitudinal direction 191 and has a substantially rectangular parallelepiped shape. The crimp housing 200 has two interior passages 225 and two interior passages 226. The two passages 225 are circular passages located side by side in the crimp housing 200. The two passages 225 extend from the rear end 222 to the front end 221 of the rear section 220 in the longitudinal direction 191. The two passages 226 are circular passages arranged side by side and positioned below the two passages 225, respectively. The two passages 226 extend from the rear end 222 to the front end 211 in the longitudinal direction 191. The two passages 225 have the same inner diameter. The two passages 226 have the same inner diameter that is smaller than the inner diameter of the passage 225. Two recesses 227, two recesses 229 and two engaging portions 228 are formed on inner surfaces of the rear section 220. The two recesses 227 are disposed side by side and extend to the front end 221 in the longitudinal direction 191. The two recesses 229 are disposed to respectively face the two recesses 227 and extend to the front end 221 in the longitudinal direction 191. The two engaging portions 228 are oppositely disposed and extend to the front end 221 in the longitudinal direction 191. The upper surface 213 of the front section 210 is formed with two recesses 219 which are disposed side by side and extend to the front end 211 in the longitudinal direction 191. In addition, the two recesses 219 on the front section 210 are respectively aligned with the two recesses 229 in the rear section 220. A groove 260 is formed in the lateral surface 223 of the rear section 220 and extends forward from the rear end 222 in the longitudinal direction 191.

Figure 4A:
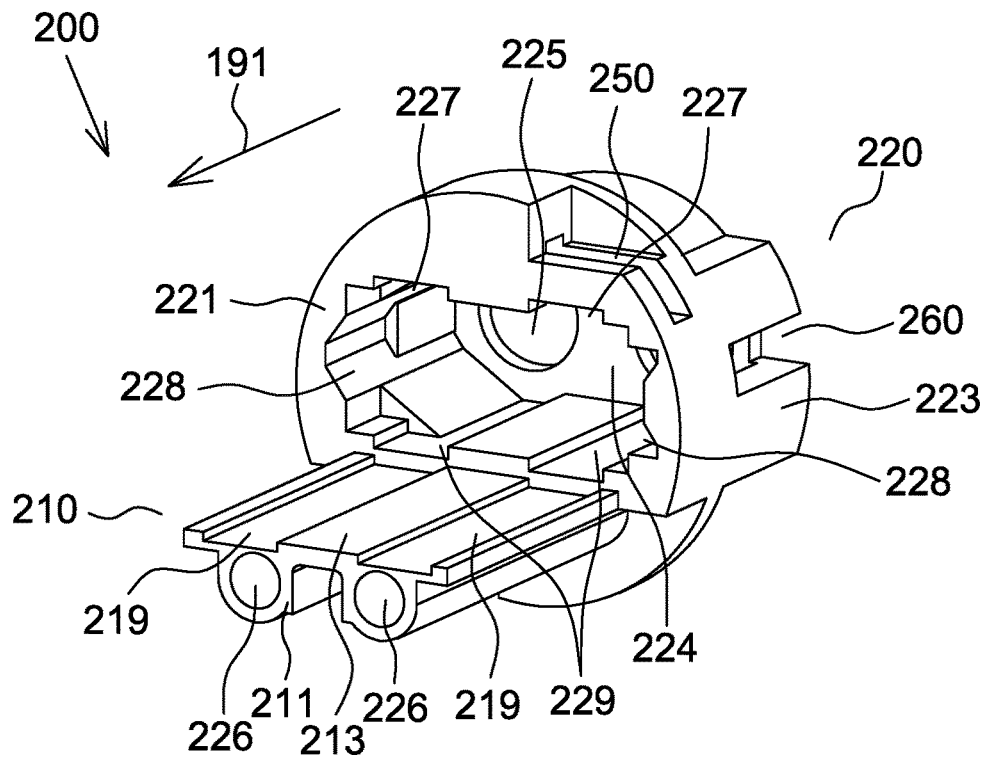
FIGS. 4a to 4e are different elevated perspective views of the crimp housing of the connector system of the present invention.
Figure 4B:
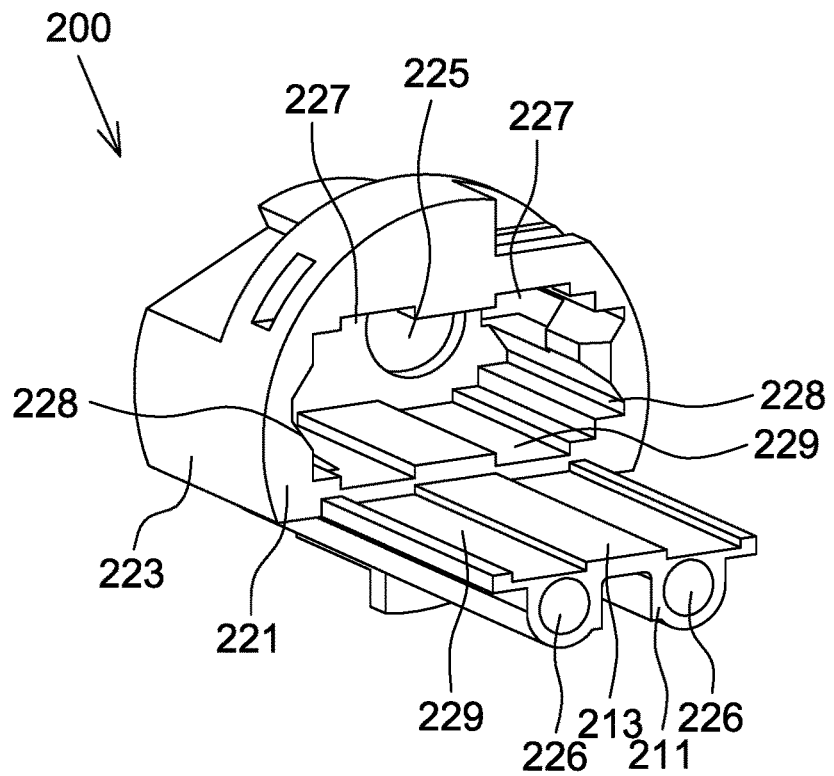
Figure 4C:
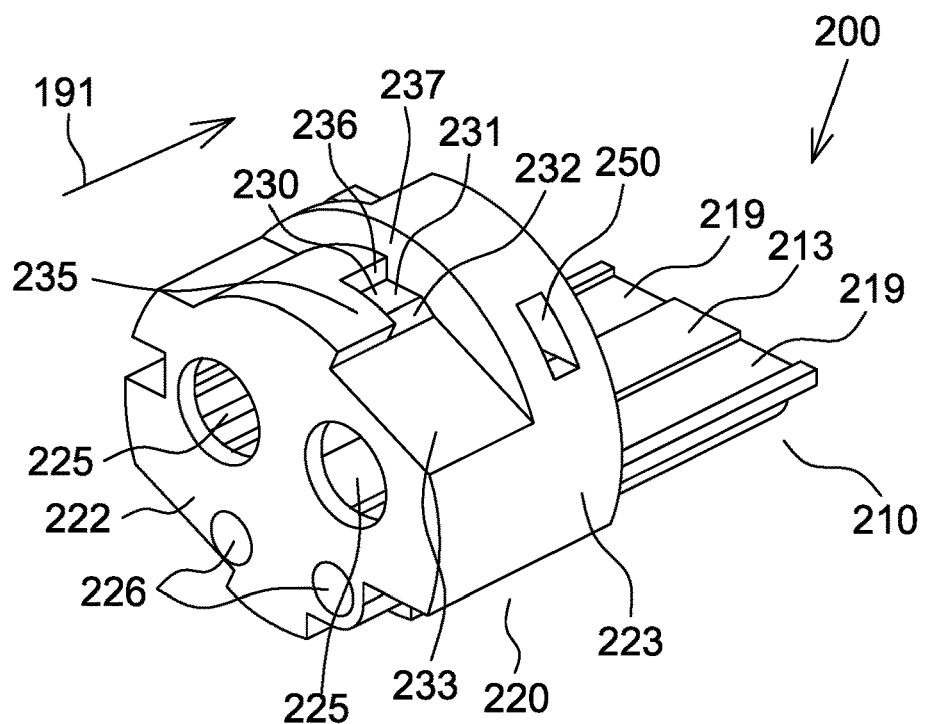

Referring to FIG. 4c, a first recess 230 is formed on the lateral surface 223 of the rear section 220. The first recess 230 is defined by a front wall 237, a left wall 236 and a rear wall 235. The walls 237, 236, 235 are not closed and a gap located on the right side of the first recess 230 is therefore formed between these walls 237, 236, 235. A first bottom surface 231 and a second bottom surface 232 are formed on the bottom of the first recess 230. The second bottom surface 232 is located on the right side of the first bottom surface 231 and is inclined downward from the left to the right. The lateral surface 223 of the rear section 220 has a slope 233 formed thereon which abuts the second bottom surface 232 and rear wall 235 on the left side and the front wall 237 on the front side.

Figure 4D:
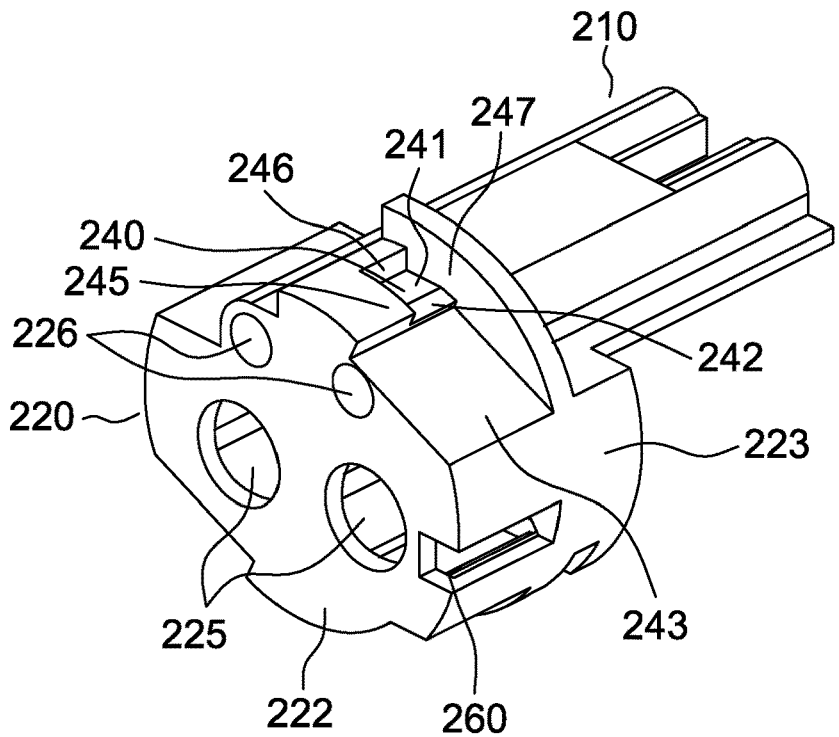

Referring to FIG. 4d, a second recess 240 is formed on the lateral surface 223 of the rear section 220. The second recess 240 is defined by a front wall 247, a left wall 246 and a rear wall 245. The walls 247, 246, 245 are not closed and a gap located on the right side of the second recess 240 is therefore formed between these walls 247, 246, 245. A first bottom surface 241 and a second bottom surface 242 are formed on the bottom of the second recess 240. The second bottom surface 242 is located on the right side of the first bottom surface 241 and is inclined downward from the left to the right. The lateral surface 223 of the rear section 220 has a slope 243 formed thereon which abuts the second bottom surface 242 and rear wall 245 on the left side and the front wall 247 on the front side.

In one embodiment, the second recess 240 is disposed opposite to the first recess 230 on the rear section 220 and may be constructed in the same manner. In other words, two first recesses 230 may be disposed on the rear section 220 of the crimp housing 200, and one of the first recesses 230 is disposed to replace the previous second recess 240.

Figure 4E:
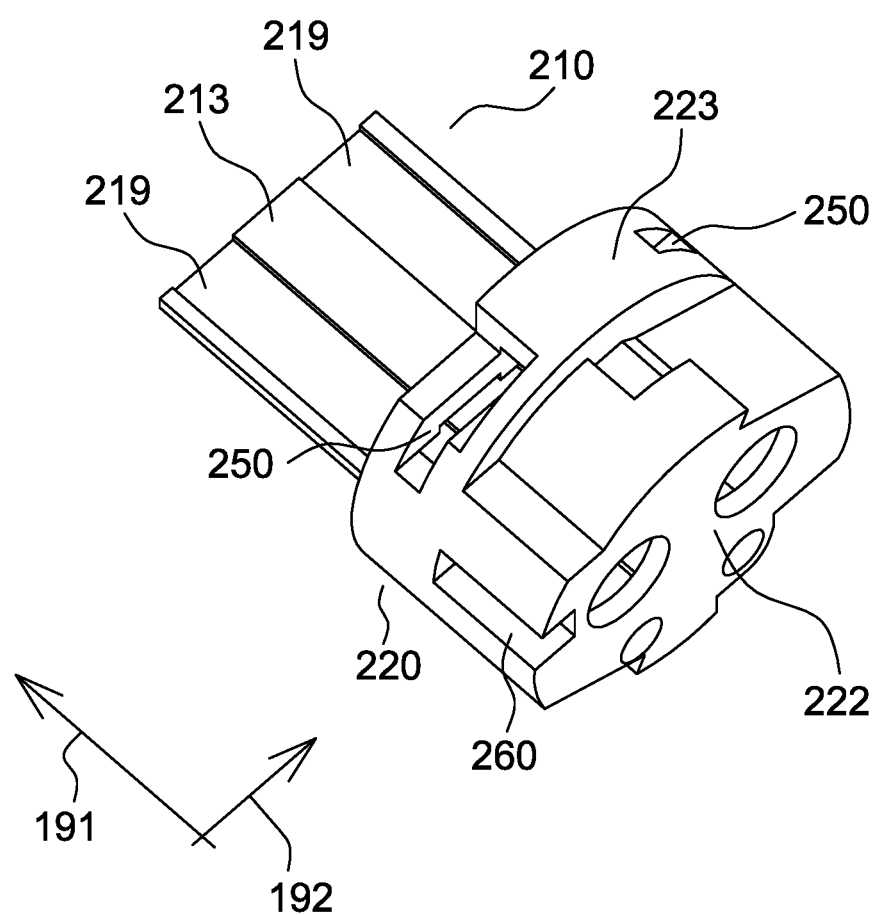
Figure 5A:
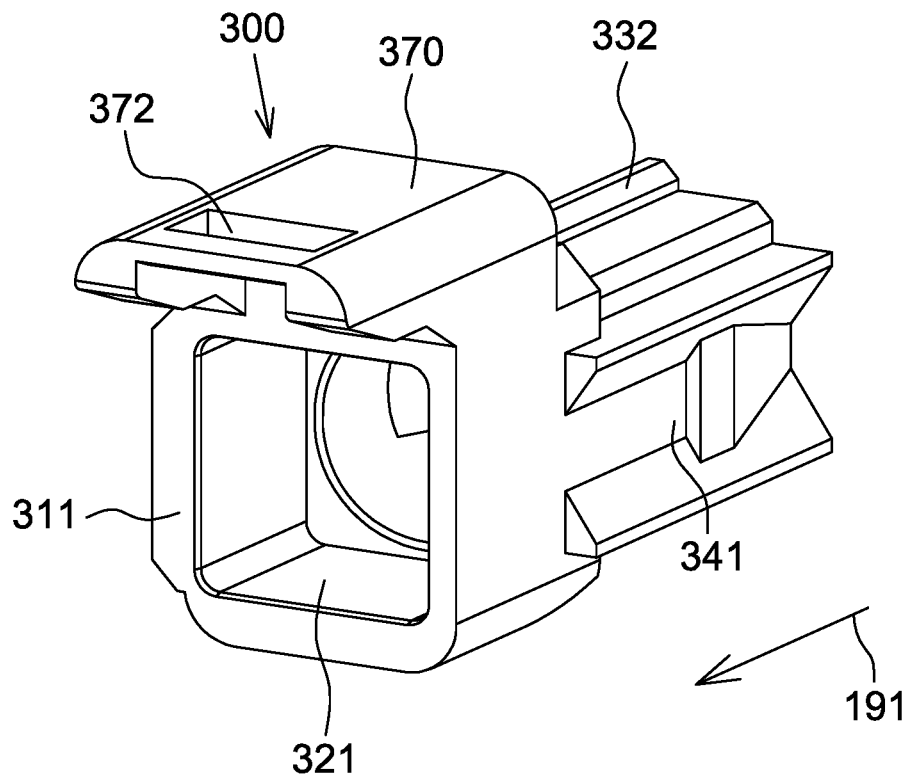
FIGS. 5a to 5d are different elevated perspective views of each floating block of the connector system of the present invention.
Figure 5B:
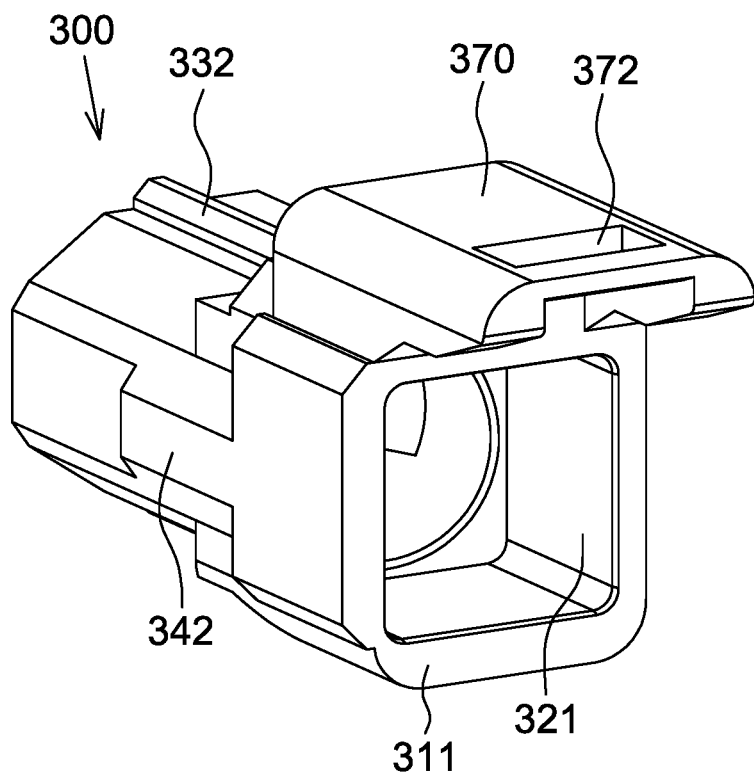
Figure 5C:
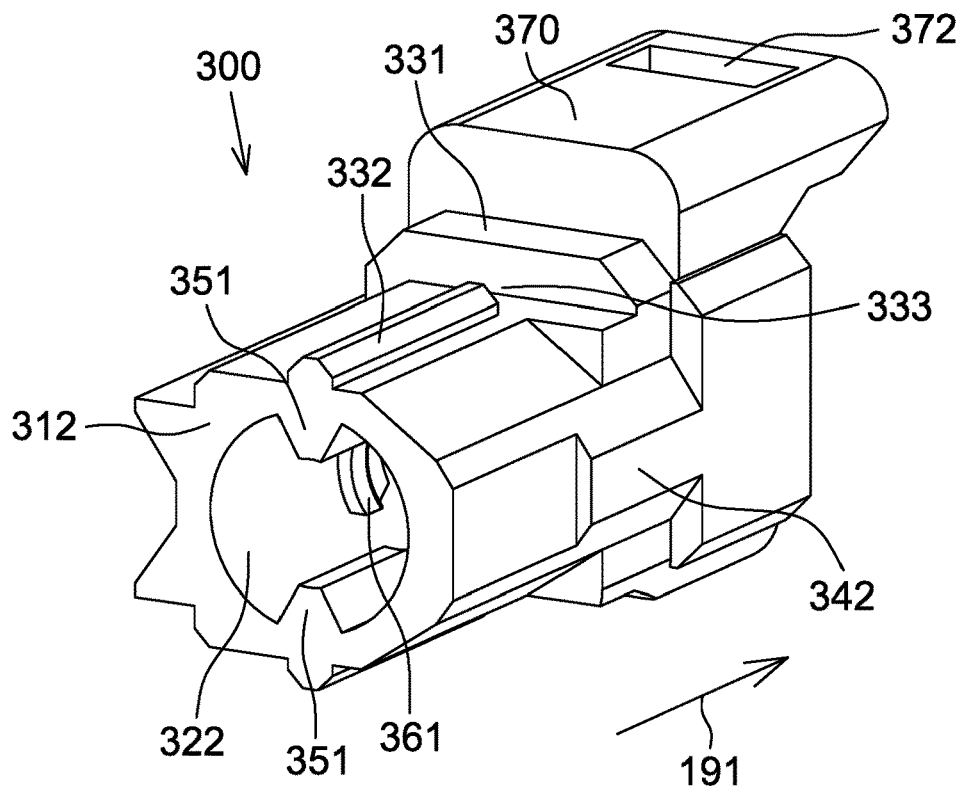
Figure 5D:
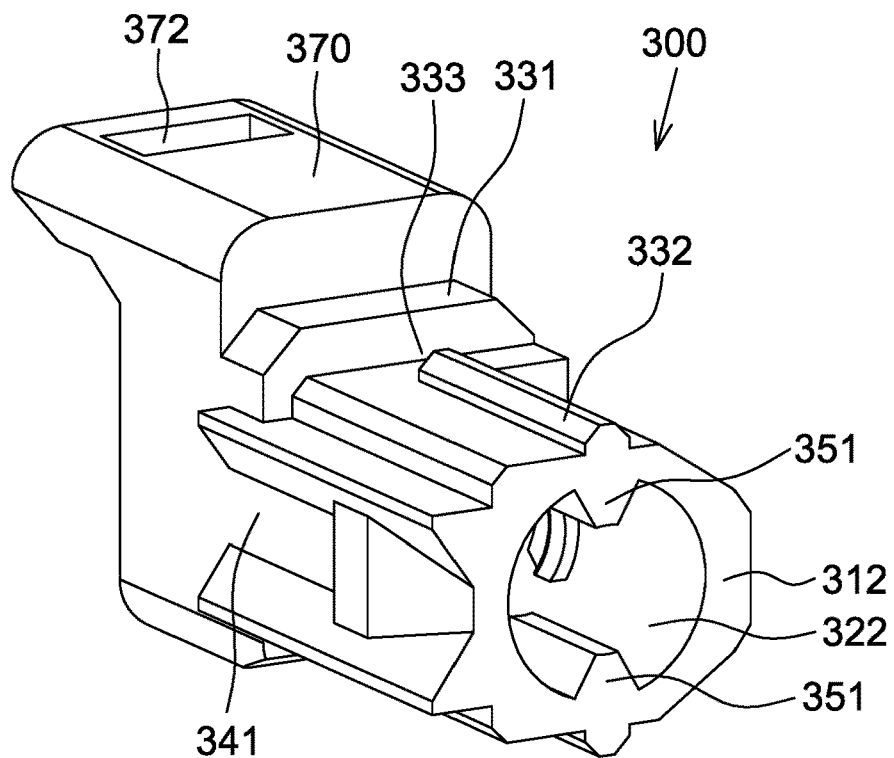
Figure 5E:
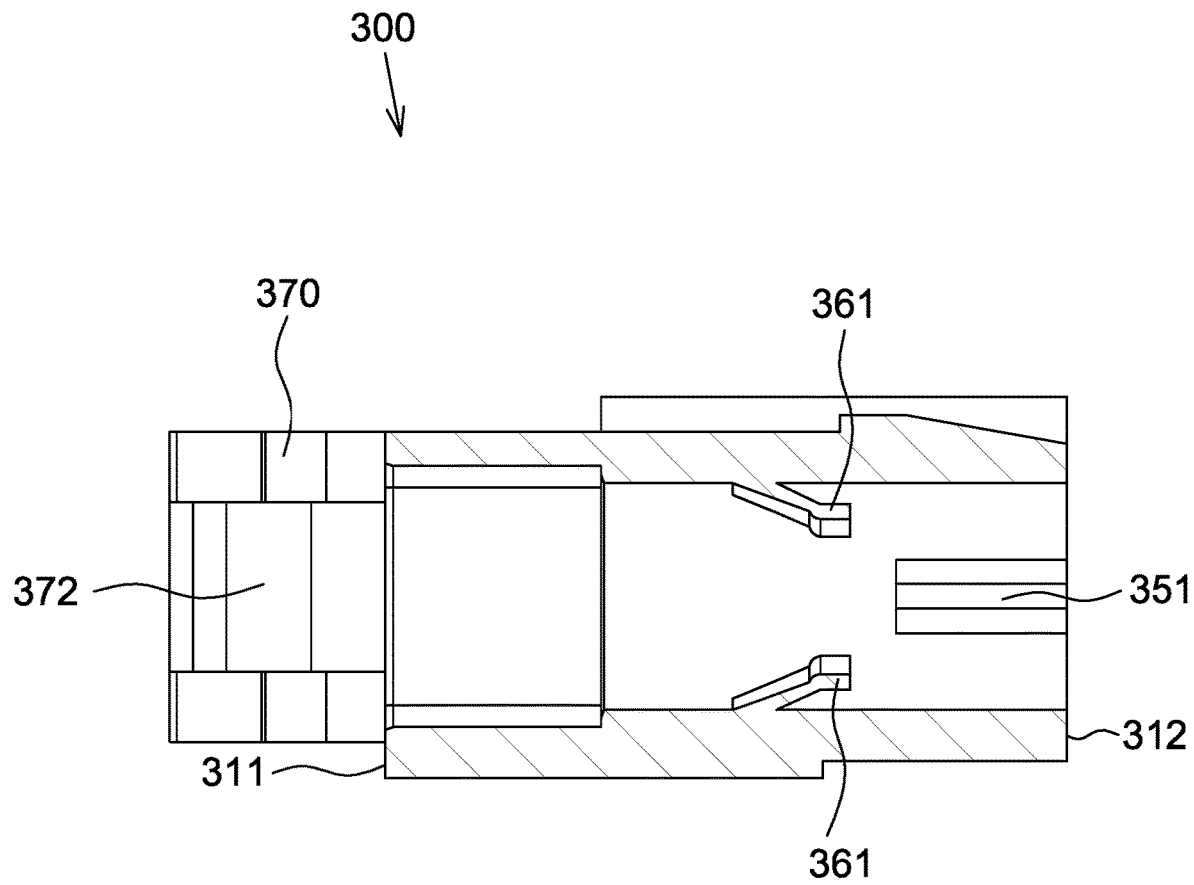
FIG. 5e is a cross-sectional view of each floating block of the connector system of the present invention.
Figure 6A:
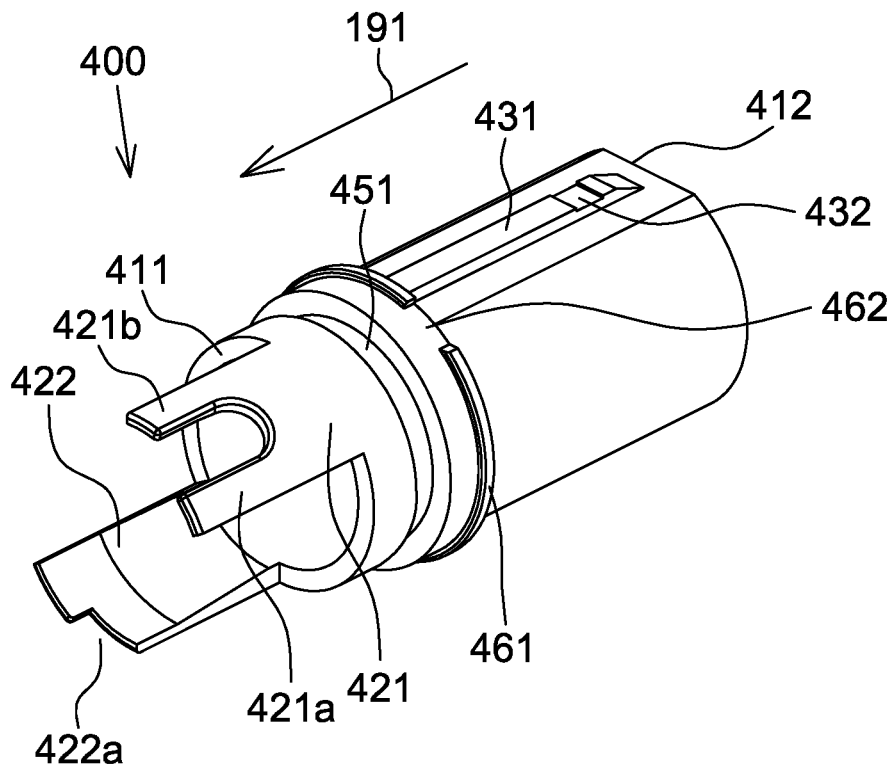
FIGS. 6a to 6d are different elevated perspective views of the stroud of the connector system of the present invention.
Figure 6B:
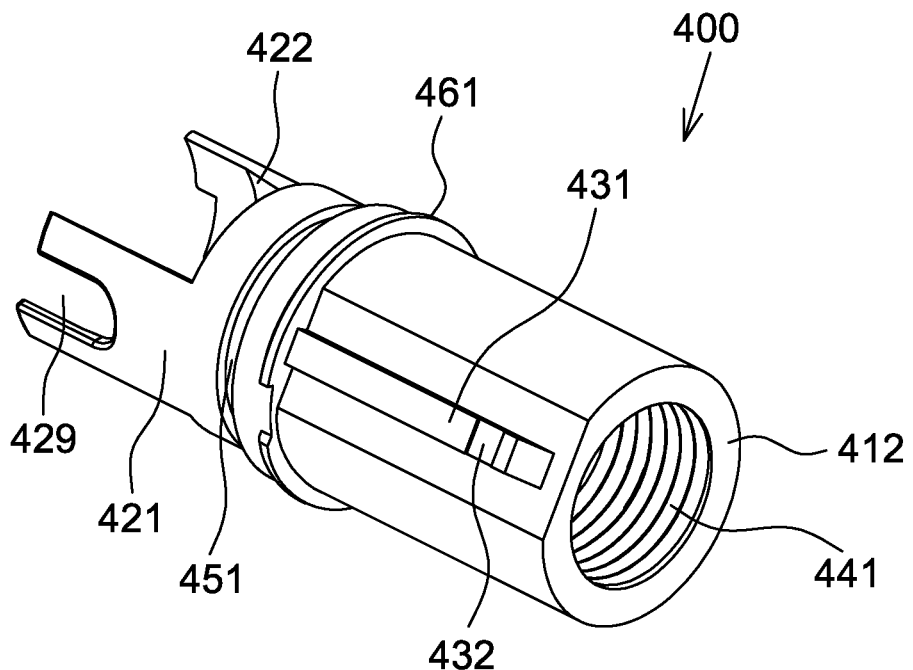
Figure 6C:
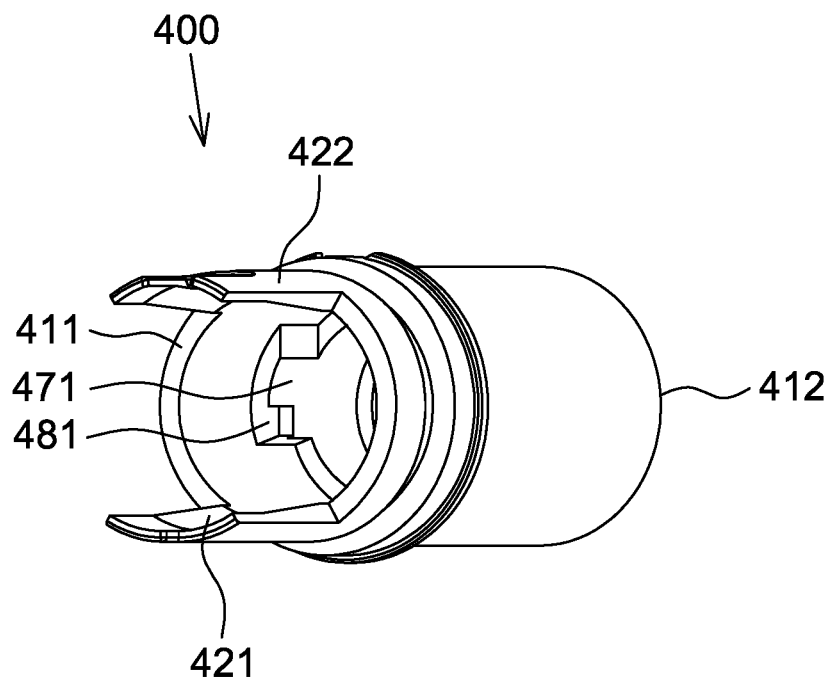
Figure 6D:
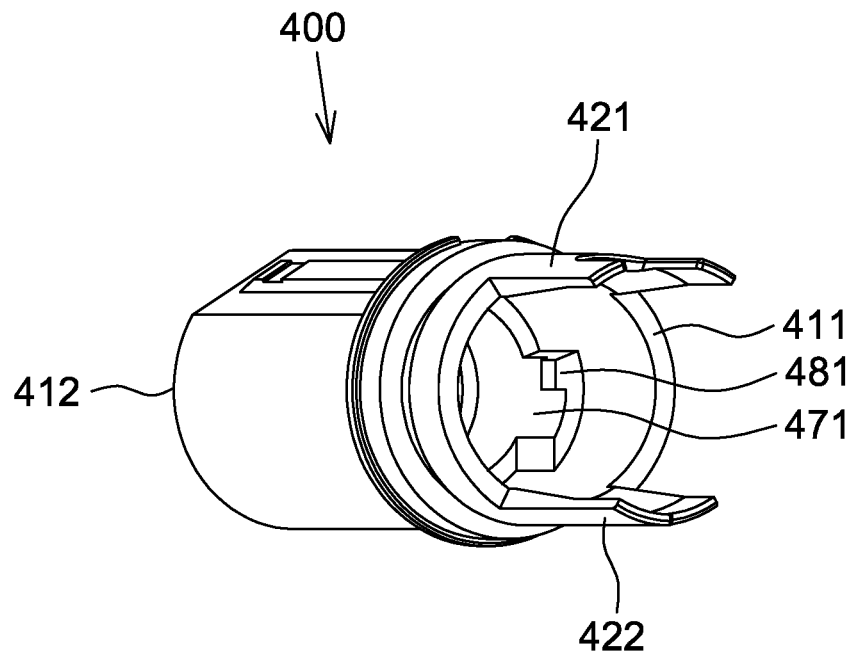

Referring to FIG. 4e, two aligned holes 250 are formed on the lateral surface 223 of the rear section 220. The two holes 250 are through holes and are oppositely disposed on the lateral surface 223. The two holes 250 extend from the exterior to the interior of the rear section 220 in a transverse direction 192 perpendicular to the longitudinal direction 191 and communicate with the recess 224.

Referring to FIGS. 5a to 5e, the floating block 300 has a substantially rectangular parallelepiped shape with a lengthwise direction parallel to the longitudinal direction 191. The floating block 300 has a hollow structure with a passage formed therein which extends from the rear end 312 to the front end 311 thereof in the longitudinal direction 191. The passage has openings 321 and 322 formed at the front end 311 and the rear end 312, respectively. The floating block 300 is generally divided into a front section and a rear section in the longitudinal direction 191, wherein the passage in the front section is a rectangular passage and the passage in the rear section is a circular passage. An elongated protrusion 331 is formed on the top wall of the rear section of the floating block 300. The protrusion 331 is disposed on the outer surface of the floating block 300 and adjacent to the front section of the floating block 300. Further, an elongated protrusion 332 is formed on the top wall of the rear section of the floating block 300. The protrusion 332 extends from the rear end 312 in the longitudinal direction 191. A gap 333 is formed between the protrusions 331 and 332. Engaging portions 341 and 342 are respectively formed on the right and left walls of the rear section of the floating block 300. The engaging portions 341 and 342 have respective shapes corresponding to the shapes of the two engaging portions 228 of the crimp housing 200 and are configured to receive the engaging portions 228, respectively. A shoulder 351 is formed on each of the top and bottom walls of the rear section of the floating block 300. The two shoulders 351 are oppositely disposed on the inner surface of the floating block 300 and extend forward from the rear end 312 in the longitudinal direction 191. A resilient arm 361 is formed on each of the right and left walls of the rear section of the floating block 300. The two arms 361 extend from the inner surface of the floating block 300 toward the rear end 312. In addition, an upper extension 370 extends forward from the front end of the top wall of the floating block 300. A window 372 is formed within the upper extension 370.

Referring to FIGS. 6a to 6d, the shroud 400 is hollow and has a generally cylindrical shape whose lengthwise direction is parallel to the longitudinal direction 191. The shroud 400 has an interior passage extending from the rear end 412 to the front end 411 thereof in the longitudinal direction 191. Two fork portions 421, 422 extend from the front end 411 of the shroud 400 in the longitudinal direction 191. The two fork portions 421, 422 are disposed to face each other. A notch 429 is formed in the front end of the fork portion 421. The notch 429 divides the fork portion 421 into a first partial fork portion 421a and a second partial fork portion 421b, wherein the first partial fork portion 421a is longer than the second partial fork portion 421b in the longitudinal direction 191. A dent 422a is formed in a corner of the front end of the fork portion 422. An alignment key 431 extending from near the rear end 412 in the longitudinal direction 191 is formed on the outer surface of the shroud 400. The shroud 400 has a thread 441 formed on the inner surface thereof. The thread 441 is located near the rear end 412 for screwing with the thread on the front section 121 of the cable gland body 120 so that the shroud 400 could be coupled to the cable gland body 120. An annular groove 451 is formed on the outer surface of the middle section of the shroud 400 for receiving the O-ring 134. In addition, a rim 461 is formed on the outer surface of the shroud 400. The rim 461 has a notch 462. Two highlands 471 are formed on the inner surface of the shroud 400 and a protrusion 481 is formed on a front corner of each of the highlands 471. The highlands 471 extend forward from the middle section of the shroud 400 in the longitudinal direction 191. The highlands 471 respectively have a generally arcuate inner surface thereby sliding smoothly on the walls 235, 245 of crimp housing 200 when the crimp housing 200 is turned with respect to the shroud 400. An indent 432 is formed in the rear section of the alignment key 431.

Referring to FIGS. 7a to 7d, the sliding collar 500 includes a hollow annular flange 510 having opposing front surface 511 and rear surface 512. A tab 541 extends perpendicularly from the rear surface 512 of the flange 510. One or more tooth portions 520 are formed on the flange 510. The tooth portions 520 extend perpendicularly from the front surface 511 in the longitudinal direction 191. In one embodiment, the sliding collar 500 has three equally spaced tooth portions 520. In addition, a tooth portion 530 extends perpendicularly from the front surface 511 in the longitudinal direction 191 and is disposed between two of the tooth portions 520. In one embodiment, the tooth portions 520, 530 collectively form a closed ring. The inner and outer surfaces of the tooth portions 520, 530 are curved surfaces. An alignment recess 531 extending from the rear surface 512 of the flange 510 to the front end of the tooth portion 530 in the longitudinal direction 191 is formed on the inner surface of the tooth portion 530. The alignment recess 531 is configured to receive the alignment key 431 on the shroud 400 to inhibit the sliding collar 500 from rotating. Therefore, the sliding collar 500 could move only in the longitudinal direction 191. The tooth portions 520 have respective lock dents 521 formed on the outer surfaces and located at the left front ends thereof. The bottom of the lock dent 521 is inclined with respect to the outer surface of the tooth portion 520 and downward toward the left side. A wall is formed on the left side of the lock dent 521 and a gap is formed on the front side of the lock dent 521. In addition, a guiding groove 550 is formed on the outer surface of each tooth portion 520. Each of the guiding grooves 550 includes a first groove 560, a second groove 570 and a third groove 580. Each of the first, second and third grooves 560, 570, 580 is defined by a bottom and a plurality of sidewalls extending upward from the bottom.

Figure 7A:
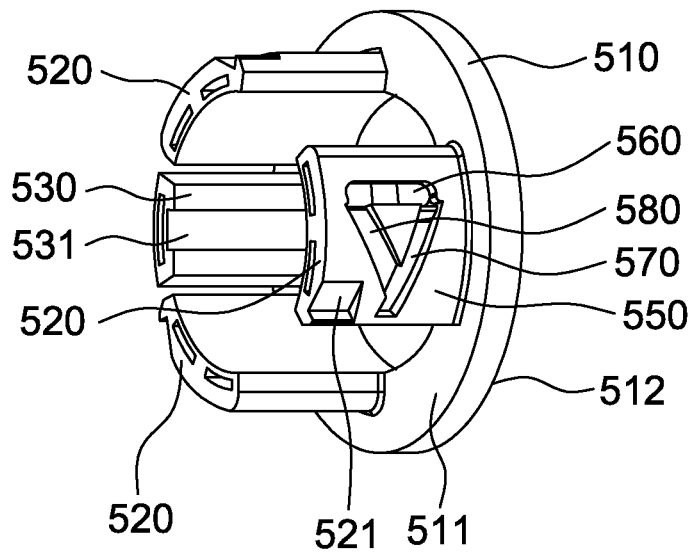
FIGS. 7a to 7d are different elevated perspective views of the sliding collar of the connector system of the present invention.
Figure 7B:
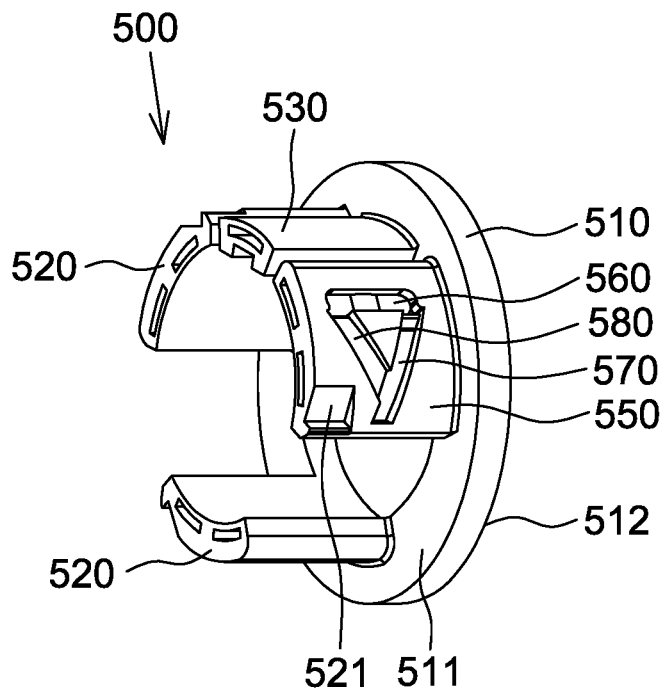
Figure 7C:
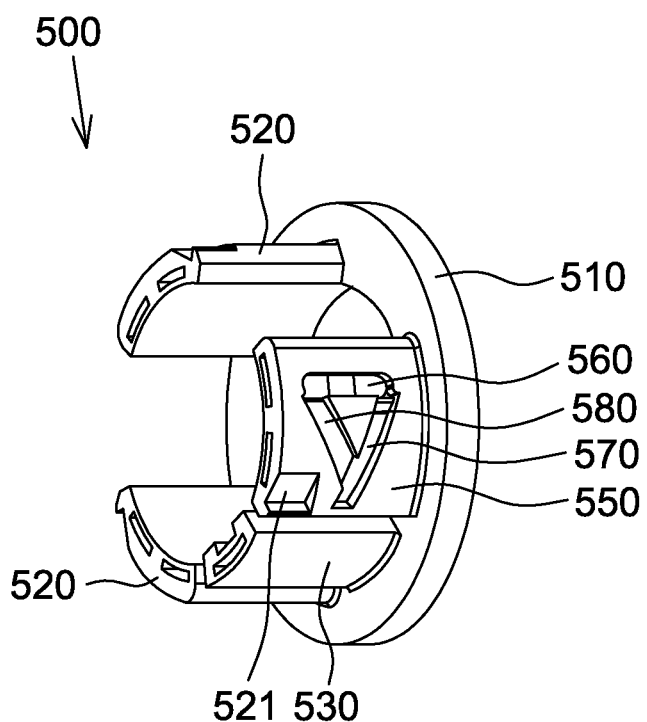
Figure 7D:
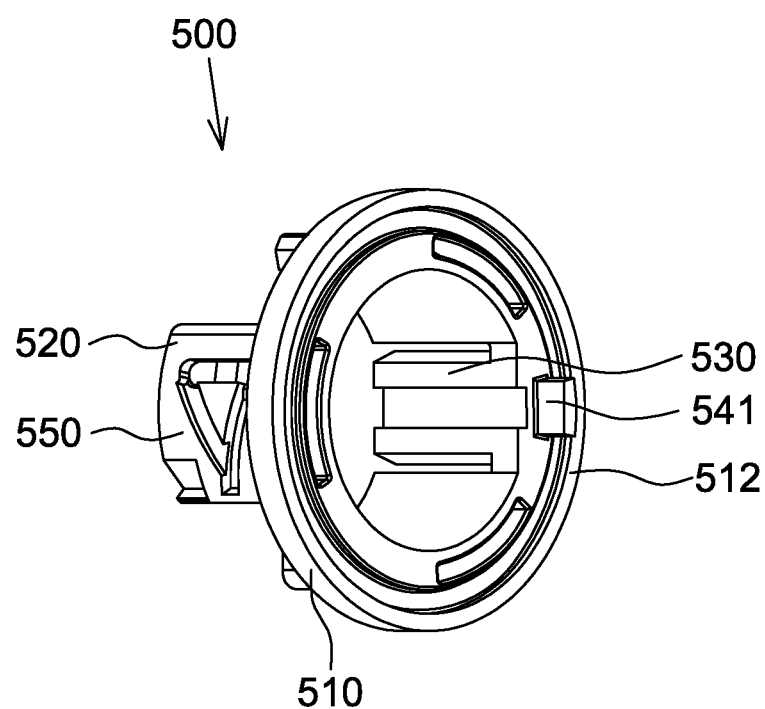
Figure 7E:
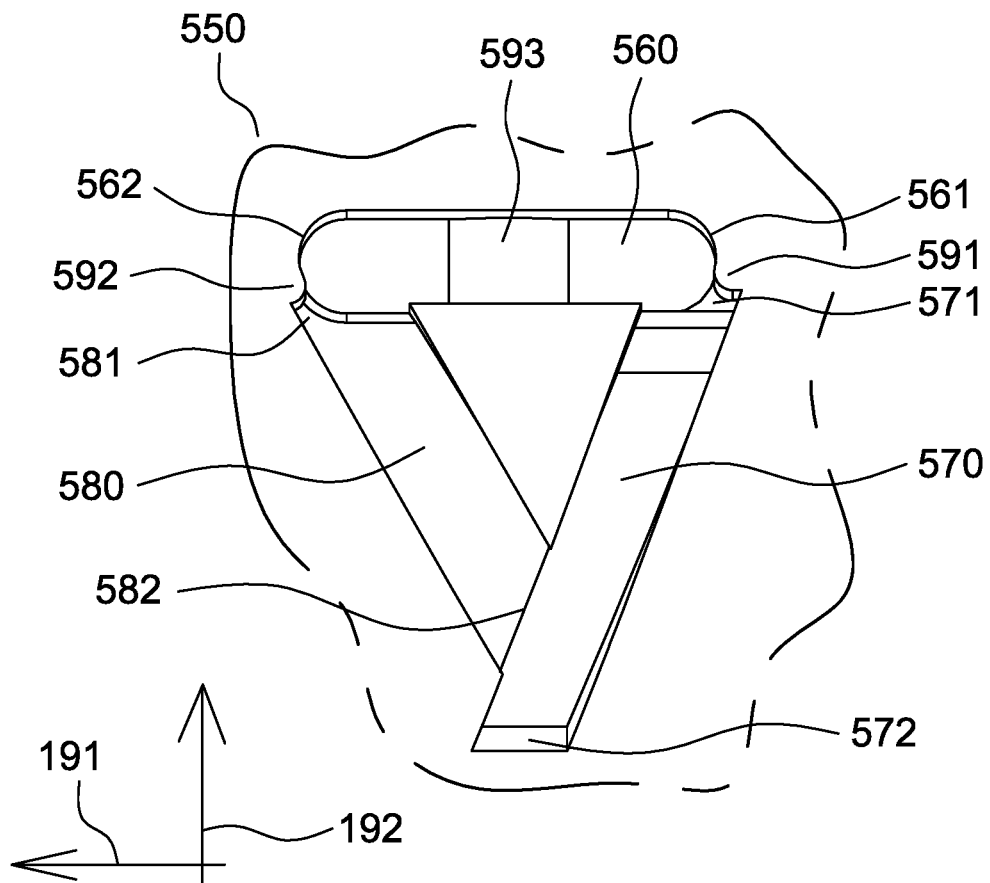
FIGS. 7e to 7g are different partially enlarged views of FIG. 7a to illustrate each of three guiding grooves on the sliding collar of the connector system.
Figure 7F:
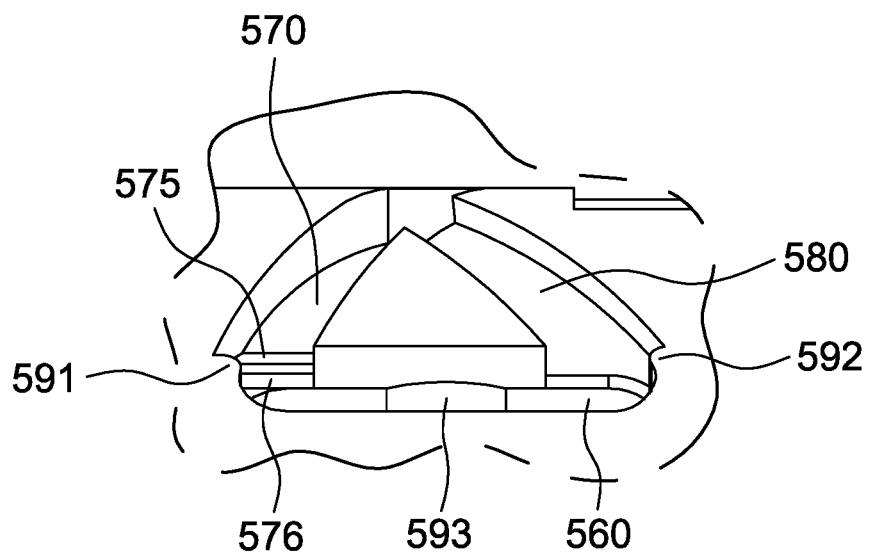
Figure 7G:
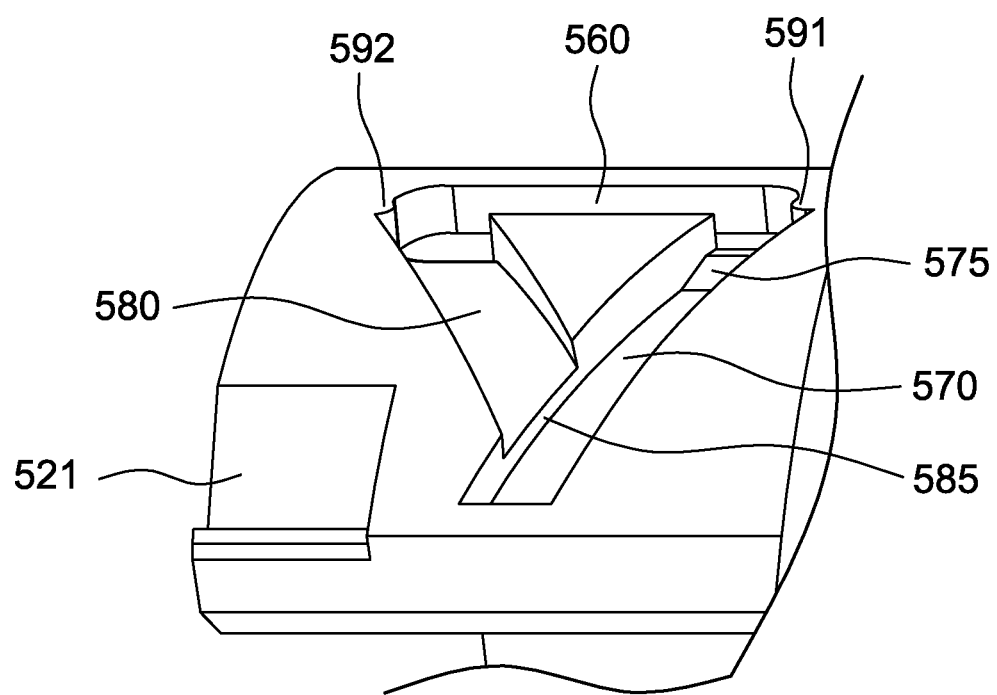
Figure 8A:
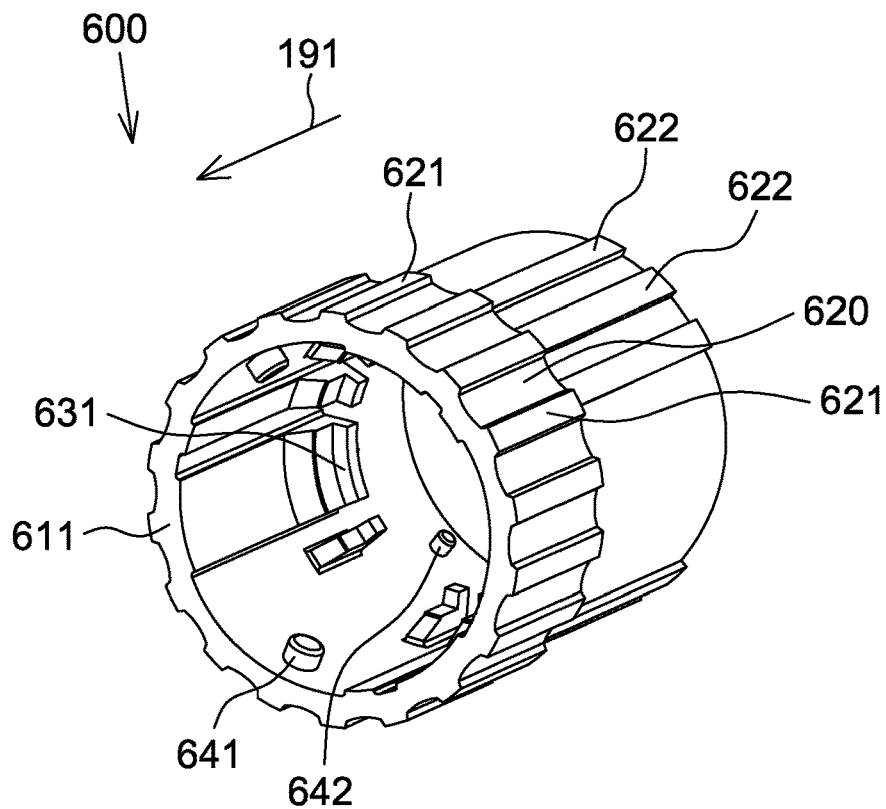
FIGS. 8a to 8d are different elevated perspective views of the plug housing of the connector system of the present invention.
Figure 8B:
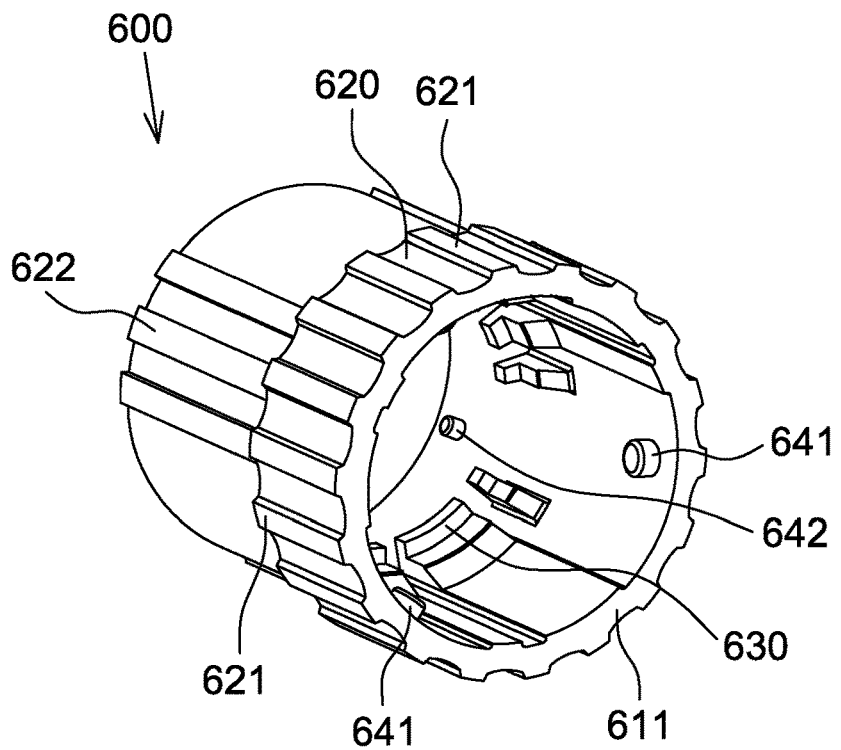
Figure 8C:
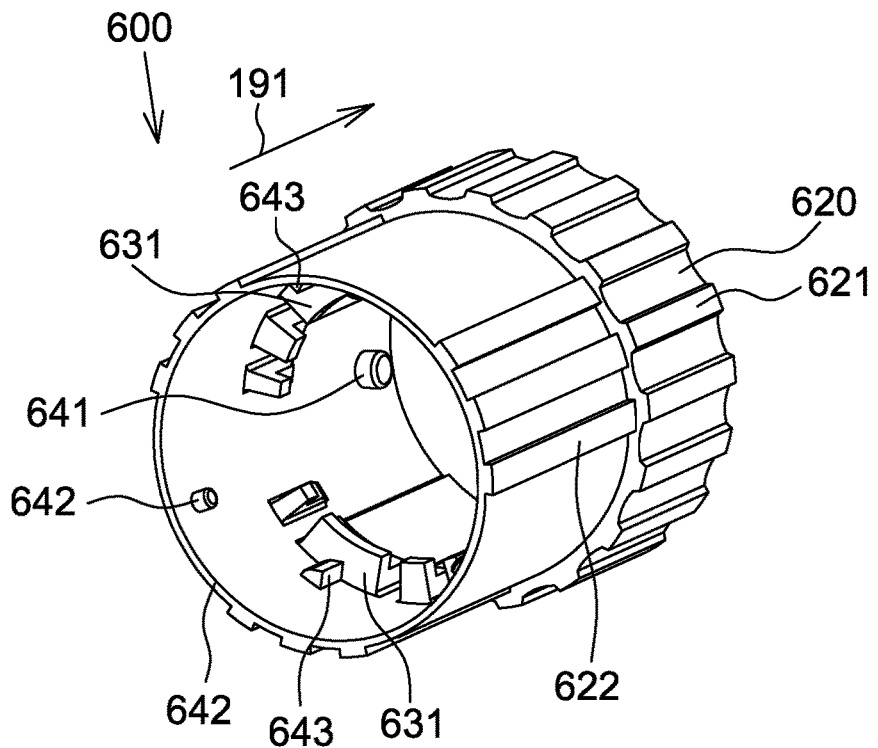
Figure 8D:
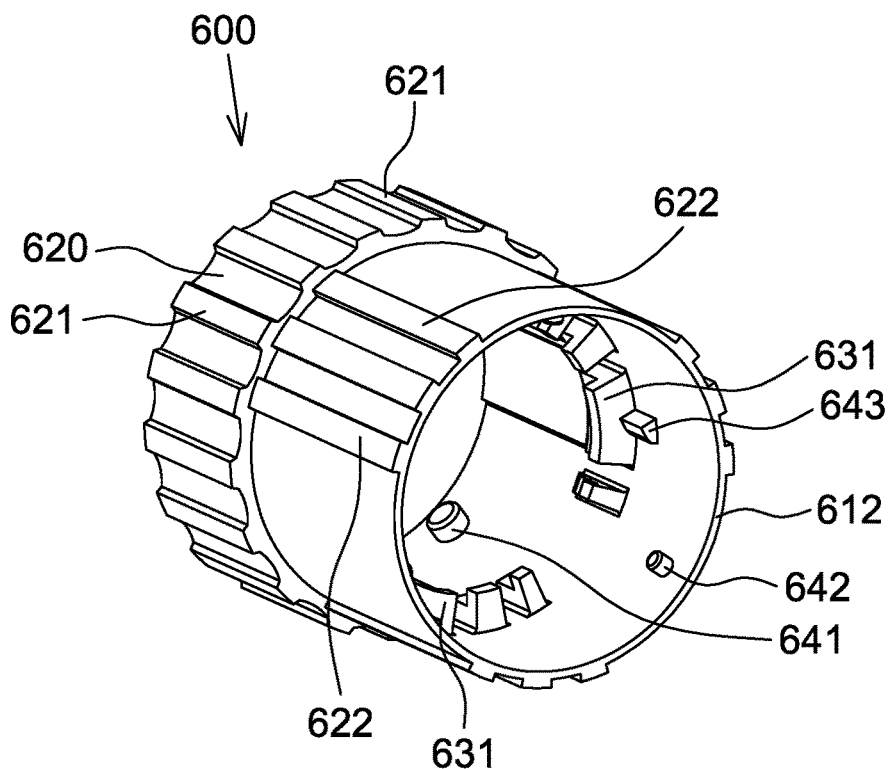

Referring to FIGS. 7e to 7g, which are different partially enlarged perspective views of the sliding collar 500 to illustrate the same guiding groove 550 on the sliding collar 500. In this embodiment, the guiding grooves 550 on the respective tooth portions 520 are identical in structure, but are not limited thereto. The guiding grooves 550 may also have different structures. The following description will be made for the same guiding groove 550 on one of the tooth portion 520.

The first groove 560 extends in the longitudinal direction 191 and its lengthwise direction is parallel to the longitudinal direction 191. The first groove 560 has opposing first and second ends 561, 562. The second groove 570 extends out from the first end 561 of the first groove 560 at a predetermined angle opposite to the transverse direction 192. The third groove 580 extends out from the second end 562 of the first groove 560 at another predetermined angle opposite to the transverse direction 192. The second groove 570 has opposing first and second ends 571, 572. The third groove 580 has opposing first and second ends 581, 582, wherein the first end 571 of the second groove 570 connects with the first end 561 of the first groove 560 and the first end 581 of the third groove 580 connects with the second end 562 of the first groove 560. The second groove 570 communicates with the third groove 580. The first, second and third grooves 560, 570, 580 communicate with each other and define a closed triangle. Therefore, the guiding groove 550 is defined by a hollow triangular bottom, a closed outer side wall and a closed inner side wall. The outer side wall and the inner side wall extend upward from the hollow triangular bottom and the outer side wall encloses the inner side wall.

A projection 591 is disposed at the junction of the second groove 570 and the first groove 560. A projection 592 is disposed at the junction of the third groove 580 and the first groove 560. The projections 591 and 592 protrude from the outer side wall toward the inner side wall of the guiding groove 550, wherein the projections 591 and 592 each have a convex curved side surface facing the inner side wall. A bump 593 is formed at the bottom of the middle section of the first groove 560. The bump 593 has a convex top whose height gradually decreases from the center thereof toward the first end 561 and the second end 562. A bump 575 is formed at the bottom of the second groove 570 and disposed near the junction of the second groove 570 and the first groove 560. The bump 575 is gradually raised toward the first groove 560 and suddenly becomes shorter when approaching the first groove 560. Therefore, a step 576 is formed between the bump 575 and the first groove 560. The step 576 is higher than the bottom of the first groove 560 and faces the projection 591. A step 585 is formed at the junction of the second groove 570 and the third groove 580. The step 585 is higher than the bottom of the second groove 570. The bottom of the third groove 580 is gradually lowered as it approaches the first groove 560.

Referring to FIGS. 8a to 8d, the plug housing 600 is hollow and has a generally cylindrical shape whose lengthwise direction is parallel to the longitudinal direction 191. The plug housing 600 has an interior passage extending from the rear end 612 to the front end 611 thereof in the longitudinal direction 191. An annular highland 620 is formed on the outer surface of the plug housing 600. The annular highland 620 is located near the front end 611. A plurality of elongated protrusions 622 is formed on the outer surface of the plug housing 600. The protrusions 622 extend from the rear end 612 to the annular highland 620 in the longitudinal direction 191. A plurality of equally spaced elongated protrusions 621 extending to the front end 611 in the longitudinal direction 191 are formed on the annular highland 620.

A plurality of shoulders 631 is formed on the inner surface of the plug housing 600. The shoulders 631 have respective lengthwise directions perpendicular to the longitudinal direction 191. In addition, the plug housing 600 is further provided with pins 641, pins 642 and lock protrusions 643 formed on the inner surface thereof. The pins 641 are located near the front end 611 and the pins 642 are located near the rear end 612. The pins 641 and 642 are cylindrical and extend perpendicularly from the inner surface of the plug housing 600. The pins 642 are configured to slide respectively in the guiding grooves 550 on the sliding collar 500.

The lock protrusions 643 are elongated and extend to the shoulders 631 in the longitudinal direction 191. The lock protrusions 643 are configured to respectively mate with the lock dents 521 on the outer surface of the sliding collar 500.

Figure 9:
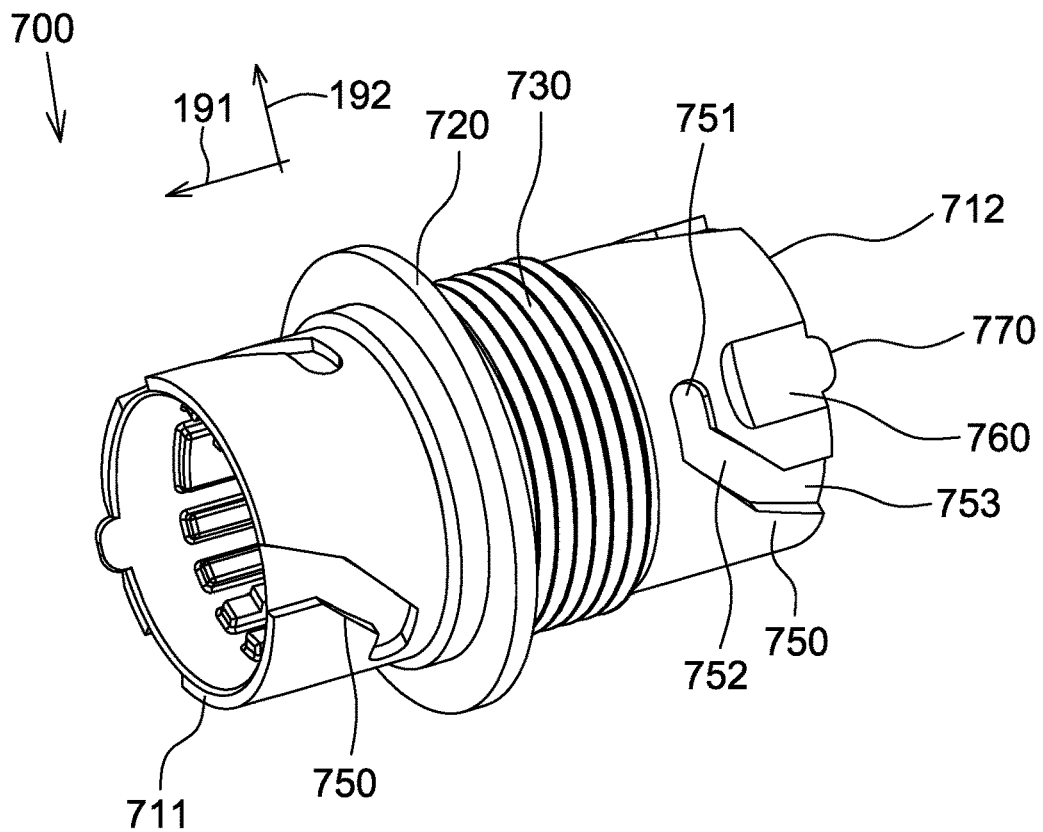
FIG. 9 is an elevated perspective view of the receptacle of the connector system of the present invention.

Referring to FIG. 9, the receptacle 700 is hollow and has a generally cylindrical shape whose lengthwise direction is parallel to the longitudinal direction 191. The receptacle 700 has an interior passage extending from the rear end 712 to the front end 711 thereof in the longitudinal direction 191. A flange 720, a thread 730, and a plurality of grooves 750 are formed on the outer surface of the receptacle 700. The thread 730 is configured to allow the nut 136 to be screwed to the receptacle 700. The grooves 750 are configured for the pins 641 on the inner surface of the plug housing 600 to slide therein, respectively. The grooves 750 respectively have a front section 751, a middle section 752 and a rear section 753, wherein the middle section 752 connects the front section 751 and the rear section 753. The rear section 753 extends forward from the rear end 712 in the longitudinal direction 191. The middle section 752 extends obliquely from the front end of the rear section 753 toward the front end 711 of the receptacle 700 at a predetermined angle. The extending direction of the middle section 752 is not parallel and not perpendicular to the longitudinal direction 191. The front section 751 extends from the front end of the middle section 752 in the transverse direction 192. A tab 770 extends from the rear end 712 of the receptacle 700. The receptacle 700 further has a dent 760 formed thereon which is adjacent to the rear end 712 and extends to the tab 770. The dent 760 and tab 770 are used as complementary indicia.

The boot 110, cable gland body 120, O-rings 131, 134, nut 136, crimp housing 200, latch 270, floating blocks 300, shroud 400, sliding collar 500, plug housing 600, and receptacle 700 may be constructed of plastics by an injection molding process. The wave spring 132 may be made of metal.

Figure 10:
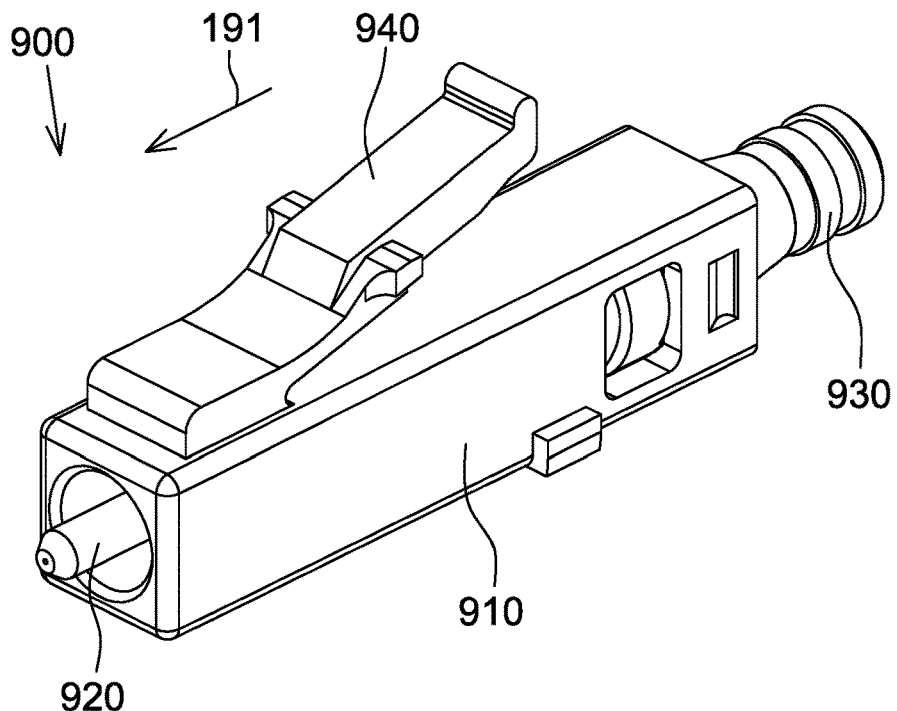
FIG. 10 illustrates a conventional optical fiber connector.
Figure 11:
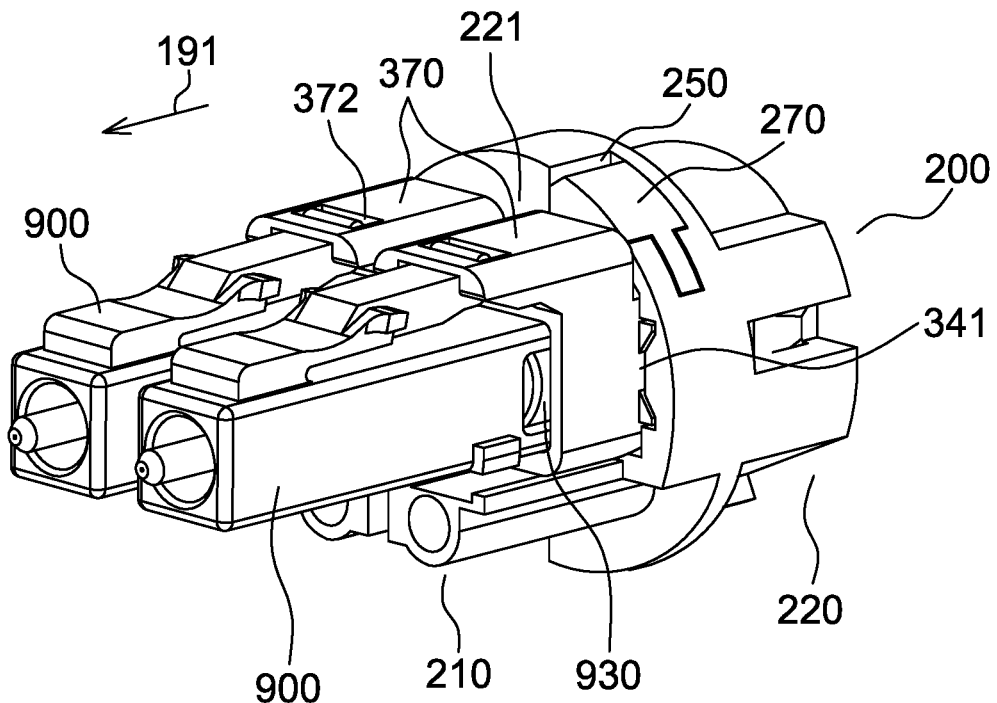
FIG. 11 is an elevated perspective view illustrating the combination of the two conventional optical fiber connectors and the crimp housing and two floating blocks of the connector system of the present invention.
Figure 12:
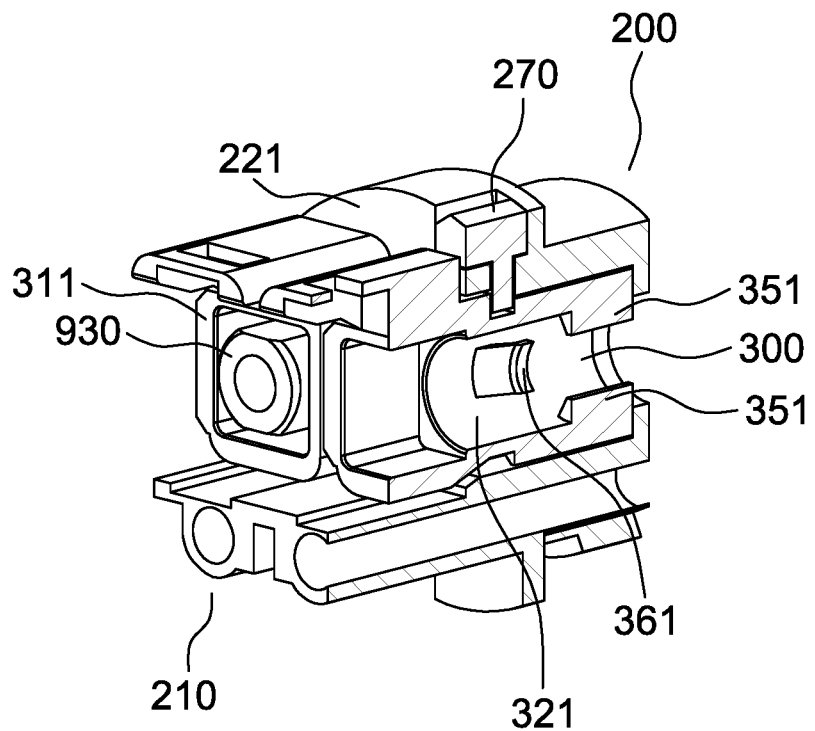
FIG. 12 is a cross-sectional view illustrating the combination of the two conventional optical fiber connectors and the crimp housing and two floating blocks of the connector system of the present invention.
Figure 13:
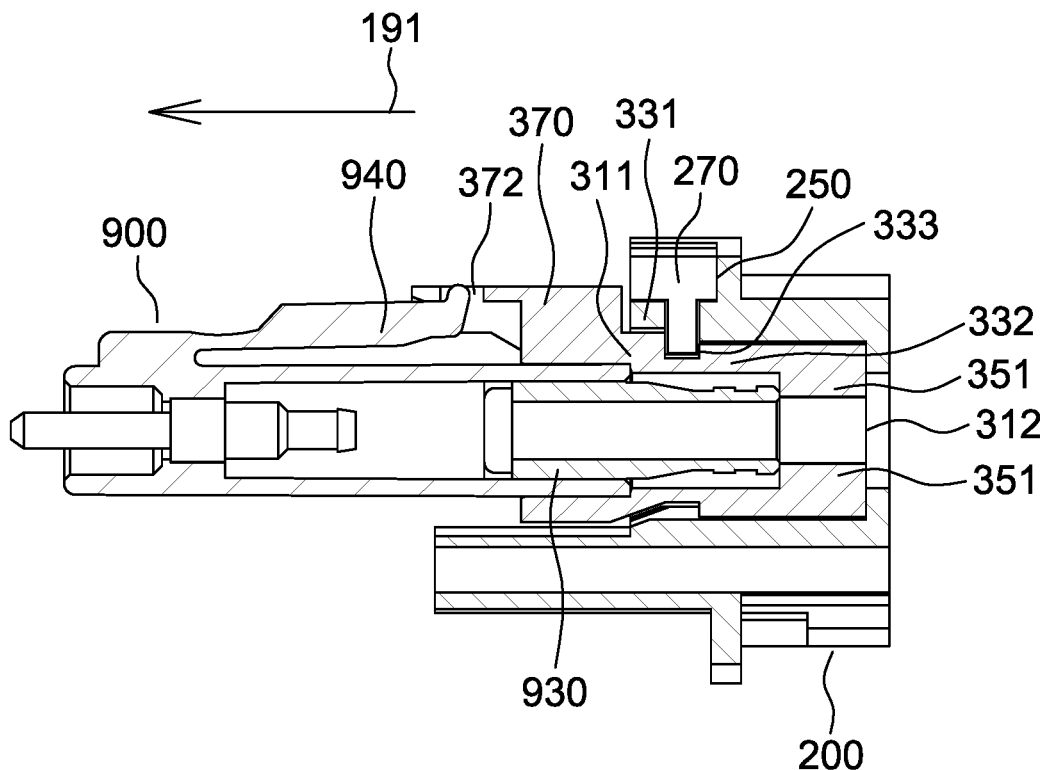
FIG. 13 is another cross-sectional view illustrating the combination of the two conventional optical fiber connectors and the crimp housing and two floating blocks of the connector system of the present invention.
Figure 14:
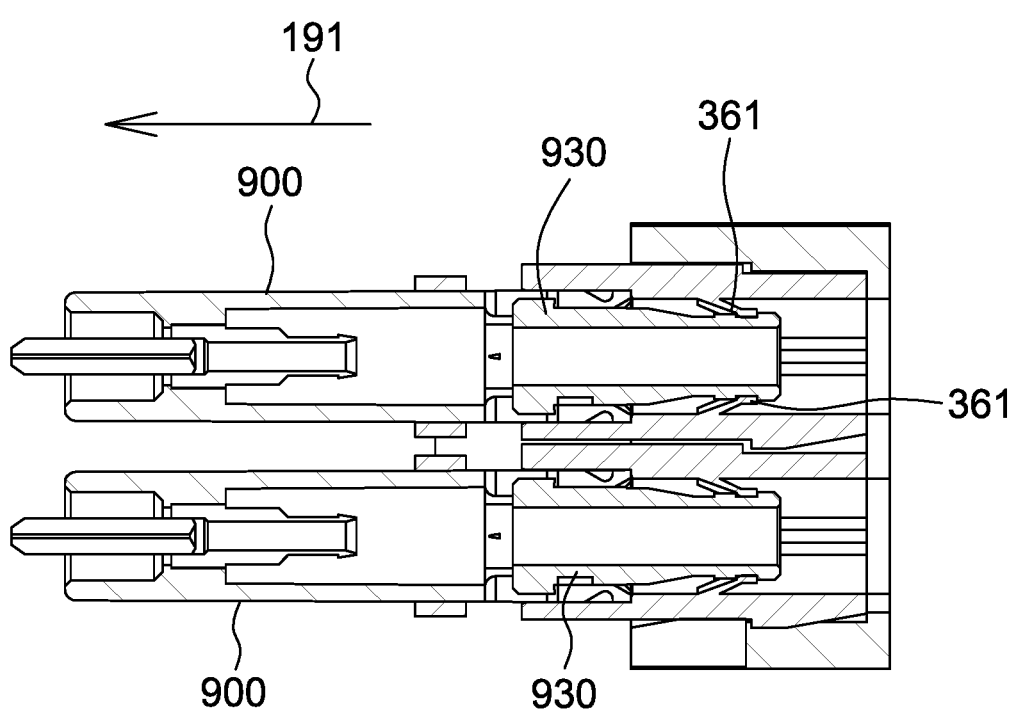
FIG. 14 is still another cross-sectional view illustrating the combination of the two conventional optical fiber connectors and the crimp housing and two floating blocks of the connector system of the present invention.

Referring to FIG. 10, the connector 900 is a conventional LC type optical fiber connector that has at least one fiber ferrule 920 extending from a front opening of a body 910 in the longitudinal direction 191. A back post 930 extends from the rear end of the body 910. Extending from the top wall of the body 910 is a lock/release arm 940 that could be depressed against the top wall. Since the LC type optical fiber connector is conventional, its structure will not be further described. In other embodiments, the connector 900 could also be other types of optical fiber connectors, such as SC or MPO type optical fiber connectors.

Referring to FIGS. 11 to 14, the rear sections of the two floating blocks 300 are inserted into the recess 224 of the crimp housing 200. The back posts 930 of the two connectors 900 are respectively inserted into and coupled with the two floating blocks 300 such that the arms 940 of the two connectors 900 are respectively depressed by the upper extensions 370 of the two floating blocks 300 and leading ends of the arms 940 are respectively placed in the two windows 372. For sake of clarity elements such as springs inside the connector 900 are not depicted in the figures. After the floating blocks 300 are coupled to the crimp housing 200, the latch 270 could be inserted through the two holes 250 of the crimp housing 200. At this status the latch 270 is located in the gaps 333 between the protrusions 331 and protrusions 332 on the top walls of the two floating blocks 300 thereby restricting the movements of the two floating blocks 300 in the longitudinal direction 191, and preventing the floating blocks 300 from being pulled out of the crimp housing. 200. Therefore, the latch 270 acts like a stopper to restrict the movement of the two floating blocks 300 in the longitudinal direction 191. In addition, the body of the crimp housing 200 may be provided with stoppers. When the floating blocks 300 are pushed into the crimp housing 200, the stoppers could prevent the floating blocks 300 from being pulled out of the crimp housing 200. The semi-closed rear end 222 of the crimp housing 200 could prevent the two floating blocks 300 from moving backward. In addition, the body of the crimp housing 200 could restrict the movement of the two floating blocks 300 in the transverse direction. That is, the movements of the two floating blocks 300 in the longitudinal direction 191 are restricted. After the back posts 930 of the connectors 900 are respectively inserted into the floating blocks 300, the resilient arms 361 on the right and left inner walls of the floating blocks 300 respectively abuts against the grooves at the rear ends of the back posts 930 thereby restricting the movements of the back posts 930 in the longitudinal direction 191. In addition, the resilient arms 361 could also restrict the movements of the back posts 930 in the transverse direction. The shoulders 351 on the top and bottom inner walls of the floating blocks 300 could prevent the back posts 930 from moving toward the rear ends 312, respectively. In other embodiments, the floating blocks 300 could be integrally formed with the back posts 930, respectively.

Figure 15:
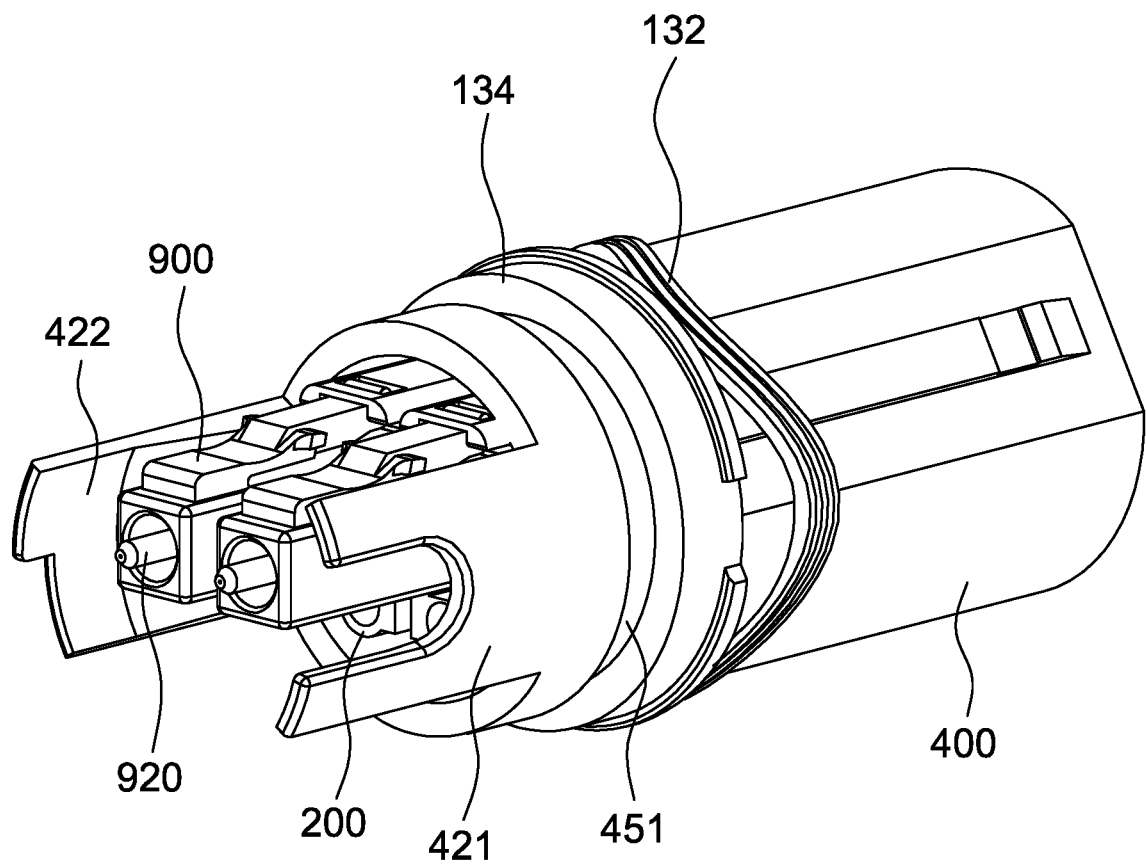
FIG. 15 is an elevated perspective view illustrating the combination of the two conventional optical fiber connectors and the crimp housing, stroud, wave spring and two floating blocks of the connector system of the present invention.

Referring to FIG. 15, the wave spring 132 is placed over the outer surface of the middle section of the shroud 400. The O-ring 134 is seated within the annular groove 451 on the shroud 400. The crimp housing 200 is mounted in the shroud 400 and the front ends of the two fork portions 421, 422 of the shroud 400 extend beyond the fiber ferrules 920 of the connectors 900.

Referring back to FIG. 4c, as shown in the figure, the outer surface of the crimp housing 200 is provided with the walls 235, 236, 237. If an object would like to enter the first recess 230, it could go only through the gap between the walls 235, 236, 237. Similarly, the object could leave the first recess 230 only through the gap. Referring back to FIG. 4d, an object could enter or leave the second recess 240 only through the gap between the walls 245, 246, 247.

Figure 16A:
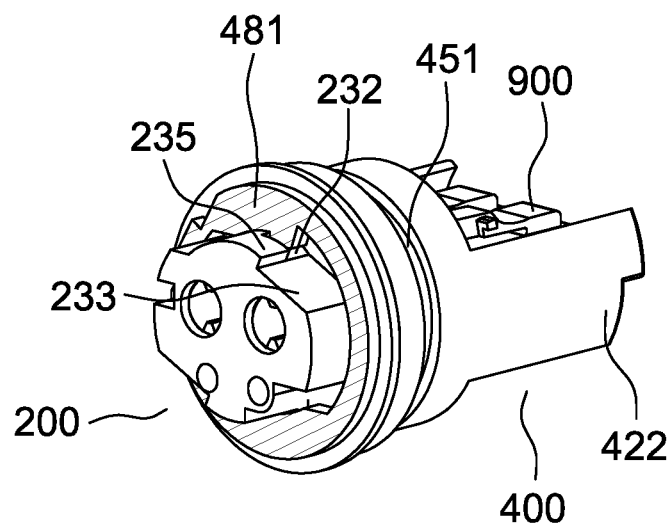
FIGS. 16a and 16b illustrate how to assemble the crimp housing in the stroud in the connector system of the present invention.
Figure 16B:
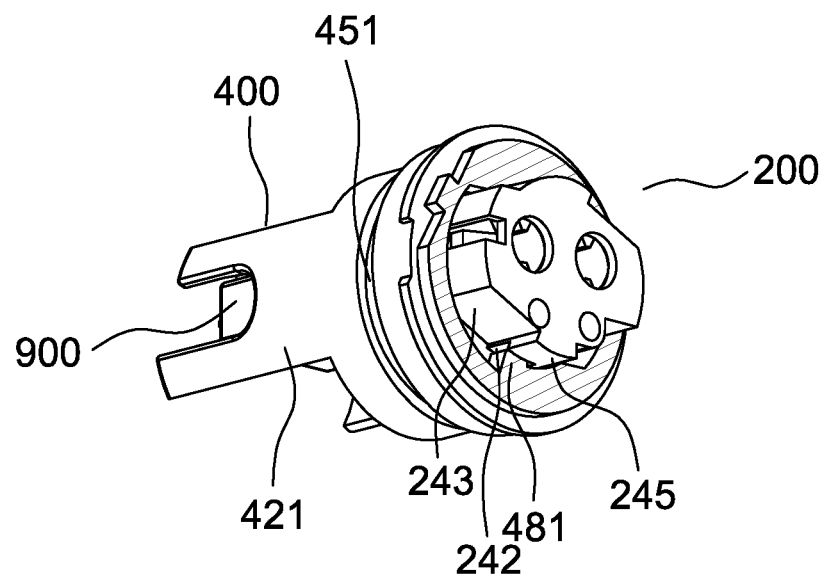

Referring to FIGS. 16a and 16b, in order to dispose the crimp housing 200 in the shroud 400, it is required to turn the shroud 400 to cause the two protrusions 481 on the inner surface thereof to enter the first and second recesses 230, 240 through the gaps, respectively. Similarly, it is required to reverse turn the shroud 400 to cause the two protrusions 481 to move out of the first and second recesses 230, 240, respectively when detaching the crimp housing 200 from the shroud 400. This may prevent the crimp housing 200 from being inadvertently pulled out from the shroud 400. After the crimp housing 200 is pulled out, the fiber ferrules 920 of the connectors 900 may be easily cleaned.

Figure 17:
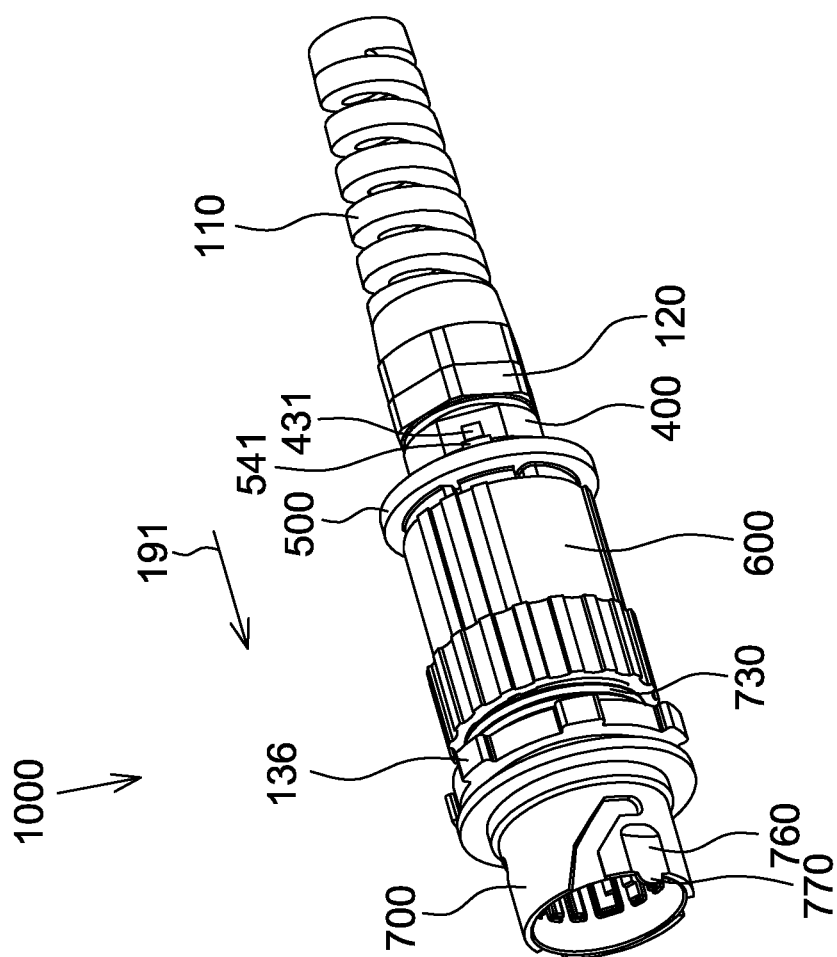
FIG. 17 is an elevated perspective view of the connector system of the present invention.
Figure 18:
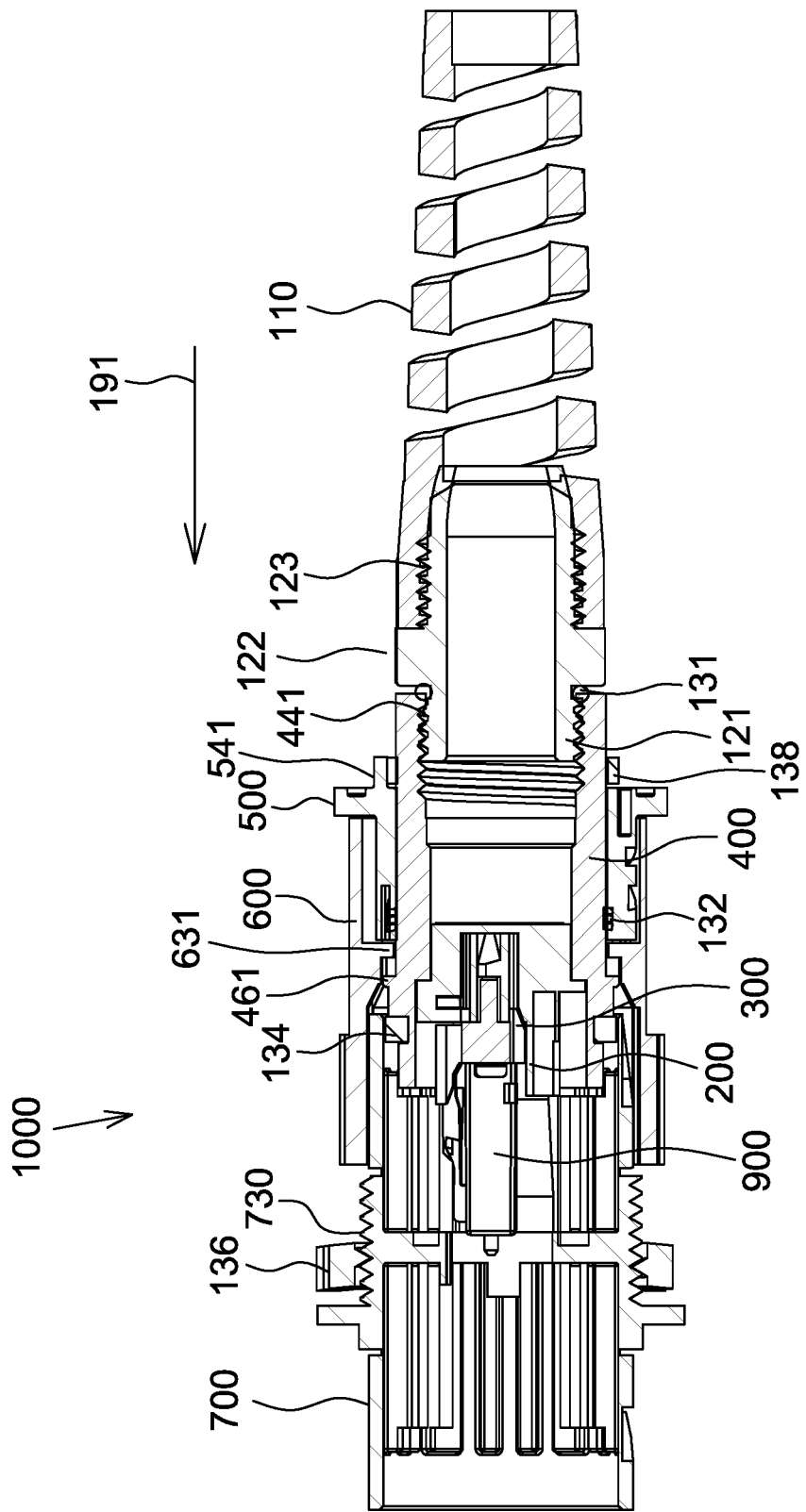
FIG. 18 is a cross-sectional view of the connector system of the present invention.

Referring to FIGS. 17 and 18, the boot 110 is coupled to the rear section 123 of the cable gland body 120. The O-ring 131 is seated over the front section 121 of the cable gland body 120 and abuts the middle section 122. The wave spring 132 is seated over the outer surface of the middle section of the shroud 400. The O-ring 134 is seated in the annular groove 451 on the shroud 400. The shroud 400 is threaded, by means of the thread 441, with the thread on the front portion 121 of the cable gland body 120 thereby being engaged with the cable gland body 120. The shroud 400 abuts against the O-ring 131. The sliding collar 500 is seated over the shroud 400 and covers the wave spring 132. The wave spring 132 is provided to generate axial force to the plug housing 600 to prevent the plug housing 600 from detaching from the receptacle 700. The alignment key 431 on the shroud 400 is inserted into the alignment recess 531 of the sliding collar 500. The nut 136 is screwed to the receptacle 700 by the thread 730. The rear section of the plug housing 600 is seated over the shroud 400 and sliding collar 500 and covers the O-ring 134. The front section of the plug housing 600 is seated over the receptacle 700. The O-ring 134 is provided to seal the gap between the shroud 400 and the plug housing 600 so as to prevent water from passing therethrough.

According to the connector system 1000 of the present invention, optical fibers could go through the boot 110, the cable gland body 120, the shroud 400, the passage 225 of the crimp housing 200 and the floating blocks 300, and finally arrive at the fiber ferrules 920 of the connectors 900. Electrical cable may also go through the boot 110, the cable gland body 120, shroud 400 and passage 226 of the crimp housing 200.

Figure 19:
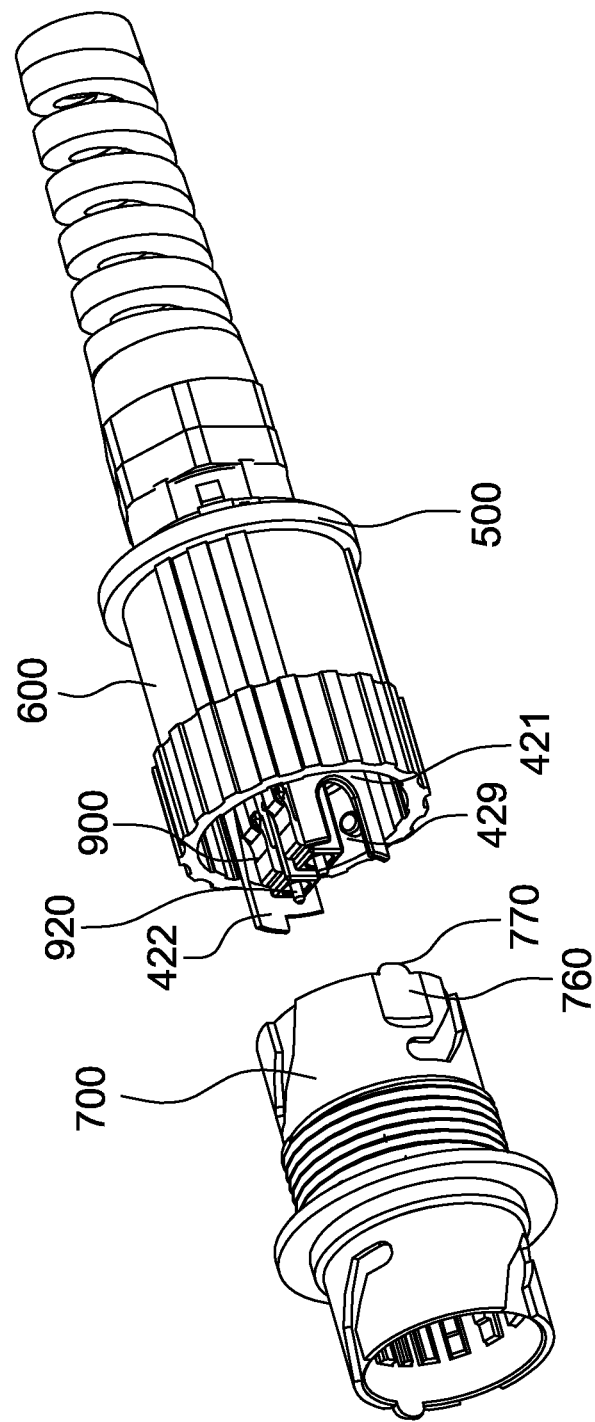
FIG. 19 illustrates how to assemble the plug housing to the receptacle in the connector system of the present invention.

Referring to FIG. 19, the two fork portions 421, 422 of the shroud 400 extend beyond the fiber ferrules 920 protruding respectively from the front openings of the connectors 900 to protect the fiber ferrules 920 from direct impact. For example, when the connectors 900 are dropped, the fiber ferrules 920 will not directly hit the ground to damage. In addition, when the plug housing 600 would like to be screwed to the receptacle 700, there is no need of visual alignment. Specifically, a user could touch both the notch 429 in the fork portion 421 and the dent 760 on the receptacle 700 to confirm the alignment. Afterward, the fork portions 421, 422 are inserted into the receptacle 700 and the plug housing 600 is turned to lock onto the receptacle 700. The notch 429 in the fork portion 421 acts as an alignment indicia and forms a touch pairing indicator with the dent 760 and tab 770 on the receptacle 700. The above-mentioned "blind" installation method is particularly suitable for use in an adverse environment, such as outdoors, at height, in poor lighting, or in a narrow space. In other embodiments, one or both of the fork portions 421, 422 may be formed at other components, such as at the crimp housing 200, in place of the fork portion 421 or 422 originally formed at the shroud 400.

Referring back to FIG. 11, there are slight gaps between the floating blocks 300 and the crimp housing 200 so that each of the floating blocks 300 could make limited three-dimensional movements with respect to the crimp housing 200. The two connectors 900 coupled to the respective floating blocks 300 could independently move accordingly. Therefore, when the two connectors 900 are mated with a duplex type adapter disposed in the receptacle 700, they all could correctly align with the adapter. The alignment of the optical fiber connectors with each other is very critical since a single-mode fiber has a core of small diameter. Additionally, the upper extension 370 of the floating block 300 could depress the lock/release arm 940 of the connector 900 to enable the connector 900 to be pulled out of the adapter. The leading end of the arm 940 is placed in the window 372 of the upper extension 370. This may prevent the connector 900 from being disengaged from the floating block 300.

When the connector system 1000 of the present invention is to be assembled, the arms 940 on the two connectors 900 are first depressed and held. The back posts 930 are then inserted into the two floating blocks 300, respectively and the leading ends of the arms 940 are respectively placed in the windows 372 of the upper extensions 370. Then, the two floating blocks 300 are inserted into the crimp housing 200 and the latch 270 is inserted through the two holes 250 of the crimp housing 200 to confine the two floating blocks 300. The O-ring 134 is seated within the annular groove 451 on the shroud 400. Subsequently, the crimp housing 200 is inserted into the front end of the shroud 400 and the two protrusions 481 on the inner surface of the shroud 400 are respectively abutted against the walls 237, 247 on the outer surface of the crimp housing 200. The shroud 400 is then turned to cause the two protrusions 481 to move into the first recess 230 and second recess 240, respectively.

Afterward, the plug housing 600 is placed over the sliding collar 500, and the pins 642 are placed in the lock dents 521 on the outer surface of the sliding collar 500, respectively. The plug housing 600 is then turned and pushed toward the sliding collar 500 such that the pins 642 are respectively moved into the guiding grooves 550. Finally, the lock protrusions 643 are respectively moved into the lock dents 521. The wave spring 132 is then placed over the middle section of the shroud 400, and the alignment key 431 on the shroud 400 is inserted into the alignment recess 531 on the sliding collar 500. The O-ring 131 is then placed over the front section 121 of the cable gland body 120, and the front section 121 of the cable gland body 120 is screwed to the shroud 400. The boot 110 is screwed to the rear section 123 of the cable gland body 120. The notch 429 in the fork portion 421 of the shroud 400 is then aligned with the tab 770 of the receptacle 700, and the fork portions 421, 422 are inserted into the receptacle 700. Then, the plug housing 600 is turned to cause the pins 641 on the inner surface thereof to respectively slide in the grooves 750 on the receptacle 700. Finally, the plug housing 600 is locked to the receptacle 700 so that the connectors 900 are mated with an adapter within the receptacle 700. It is to be noted that the connectors 900 have respective optical fibers extending out from the back posts 930 thereof and the optical fibers need to first go through the above components before these components are assembled together.

When the pins 642 of the plug housing 600 are respectively located in the first grooves 560 of the sliding collar 500, the pins 641 are respectively located in the front sections 751 of the grooves 750, and the lock protrusions 643 are respectively positioned in the lock dents 521. The sliding collar 500 is then pulled backward to cause the pins 642 to respectively slide in the first grooves 560 and pass over the bumps 593 to move to the junctions of the first grooves 560 and the third grooves 580. At this status the lock protrusions 643 will respectively move out the lock dents 521 from the front ends of the lock dents 521. The plug housing 600 is then turned to cause the pins 641 to slide from the front sections 751 through the middle sections 752 to the rear sections 753 of the grooves 750, respectively. Since the sliding collar 500 fails to be turned with respect to the receptacle 700 and could move only in the longitudinal direction 191, the pins 642 will respectively slide from the first grooves 560 into the third grooves 580 when the plug housing 600 is turned. At this moment the shroud 400 could be pulled backward to cause the pins 641 to move out the grooves 750, respectively thereby separating the connectors 900 from the adapter in the receptacle 700.

When the connectors 900 would like to be inserted into the adapter in the receptacle 700, the plug housing 600 is turned to cause the pins 642 to move to the second grooves 570, respectively. Then, the plug housing 600 is moved to have the pins 641 placed in the rear sections 753 of the grooves 750, respectively. The plug housing 600 is then turned to cause the pins 641 to slide into the middle sections 752 and arrives in the front portions 751, respectively. When the plug housing 600 is turned, the pins 642 will not move back to the third grooves 580, respectively due to the blocking of the steps 585. Since the sliding collar 500 could move only along the longitudinal direction 191, the pins 642 will slide respectively within the second grooves 570 and pull the sliding collar 500 toward the plug housing 600. Finally, the pins 642 will pass over the bumps 575 and arrive in the first grooves 560, respectively. When the pins 642 respectively move to the first grooves 560, the connectors 900 are further inserted into and fully mated with the adapter in the receptacle 700 to come to a locked state. In addition, when the plug housing 600 is turned, the lock protrusions 643 will pass over the walls on the left sides of the lock dents 521 and finally fall into the lock dents 521, respectively. Referring back to FIG. 18, when the connector system 1000 comes to the locked state, the shoulders 631 on the inner surface of the plug housing 600 could stop the rim 461 on the shroud 400 from moving backward thereby preventing the shroud 400 from being pulled out.

The steps 576 seated in the guiding grooves 550 may stop the pins 642 from moving to the second grooves 570 from the first grooves 560, respectively and therefore act as stoppers. The walls on the left sides of the lock dents 521 may stop the lock protrusions 643 from moving out of the lock dents 521, respectively. Therefore, these walls may also stop the pins 642 from moving to the second grooves 570 from the first grooves 560, respectively. The steps 585 in the guiding grooves 550 may stop the pins 642 from moving to the third grooves 580 from the second grooves 570, respectively and therefore act as stoppers.

When a user turns the plug housing 600 to cause the pins 642 to pass over the bumps 575, respectively, the user will feel a change in resistance. This change in resistance generates a tactile feedback to allow the user to perceive that the pins 642 have moved to the first grooves 560 from the second grooves 570, respectively and the connector system 1000 comes to the locked state. The bumps 593 seated in the first grooves 560 may cause a change in resistance when the pins 642 respectively pass over. This change in resistance generates a tactile feedback to allow the user to perceive that the connector system 1000 has come to the unlock state. Further, the bumps 593 may also prevent the pins 642 from inadvertently slipping over to unlock the connector system 1000. The projections 591 and 592 are to prevent the pins 642 from staying at the respective corners of the guiding grooves 550 and ensure that the pins 642 could be moved when the plug housing 500 is turned. The steps 576, 585 seated in the guiding grooves 550 allow the pins 642 to move only in the counterclockwise direction within the guiding grooves 550 respectively to lock or unlock the connector system 1000.

Figure 20:
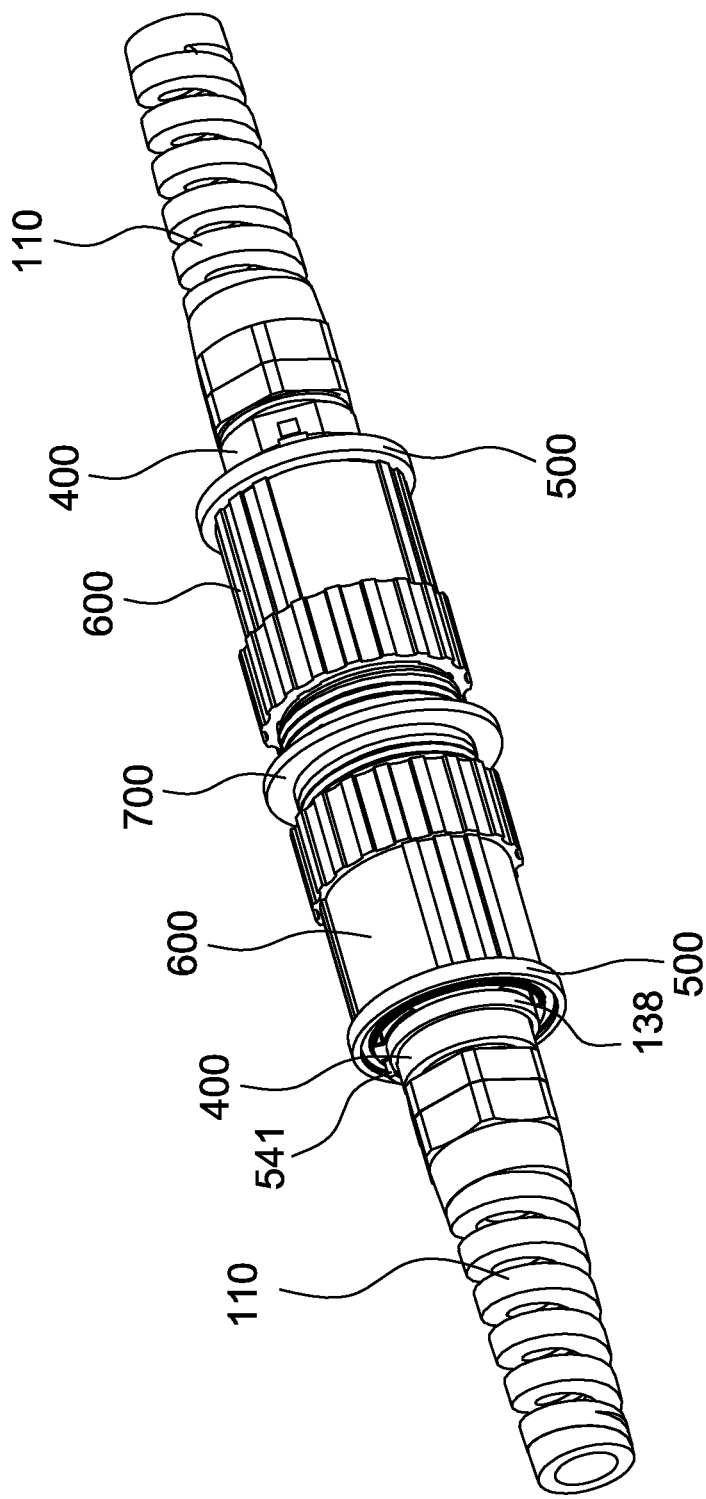
FIG. 20 illustrates that the connector system of the present invention has a function of optically coupling optical fiber connectors.
Figure 21:
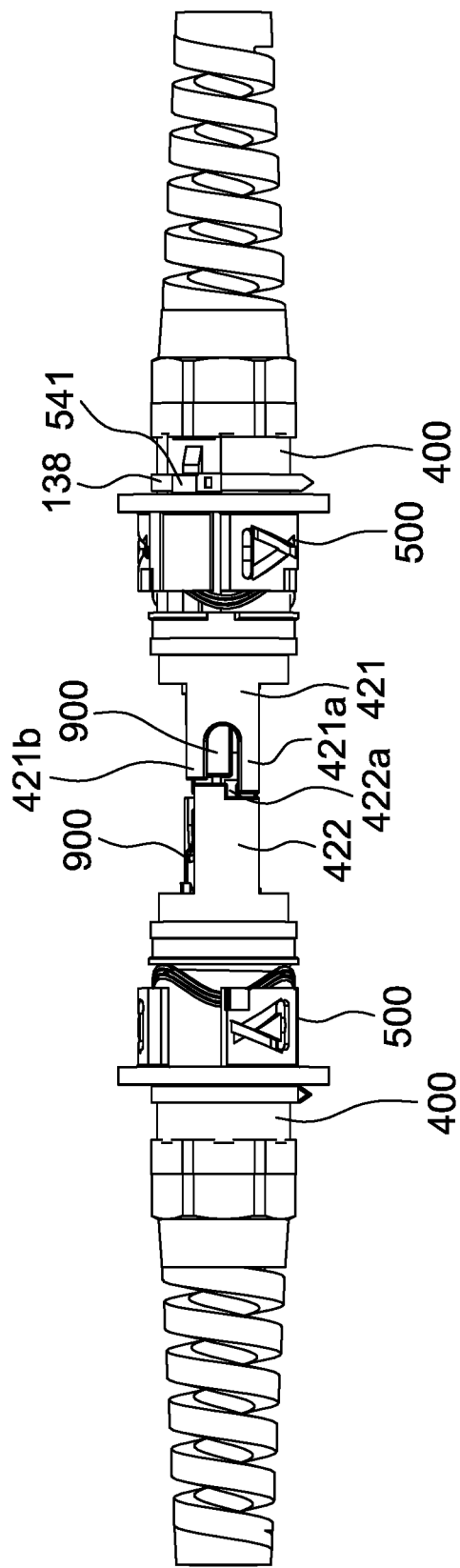
FIG. 21 illustrates that the fork portions of the shroud will not interfere with the fork portions of the opposing shroud when the connector system of the present invention is ready to optically couple optical fiber connectors.
Figure 22:
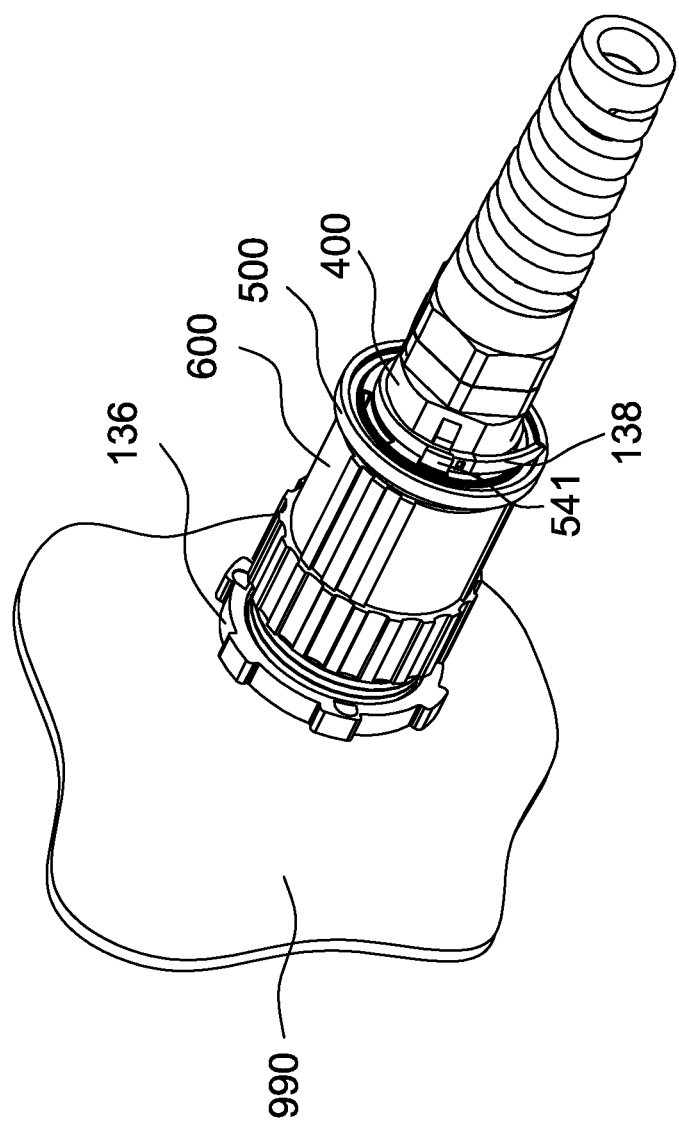
FIG. 22 illustrates that the connector system of the present invention is attached to a panel.

Furthermore, as shown in FIG. 20, the connector system 1000 of the present invention may make optical coupling for the optical fiber connectors. Specifically, the optical fiber connectors to be coupled (not shown) are inserted into the left end of the receptacle 700 utilizing another set of shroud 400, sliding collar 500 and plug housing 600. Referring to FIG. 21, the fork portion 422 is designed such that its dent 422a may receive the first partial fork portion 421a of the opposing fork portion 421. This may avoid the interference between the fork portions 421, 422 of the shroud 400 and the fork portions 422, 421 of the opposing shroud 400 when the connector system 1000 is used to make optical coupling for the optical fiber connectors. However, it should be understood that the opposing optical fiber connectors to be coupled may be inserted into the left end of the receptacle 700 utilizing a shroud, a sliding collar and a plug housing that are different from those disclosed above in the present invention. Referring to FIG. 22, the receptacle 700 may be secured to a panel 990 by the nut 136. Additionally, when the connector system 1000 is assembled, the cable tie 138 may be fastened around the shroud 400 and disposed through the indent 432 to prevent the sliding collar 500 from moving out and away from the shroud 400. The tab 541 extending from the flange 510 of the sliding collar 500 is located above the indent 432 and therefore may prevent the cable tie 138 from coming off.

Figure 23:
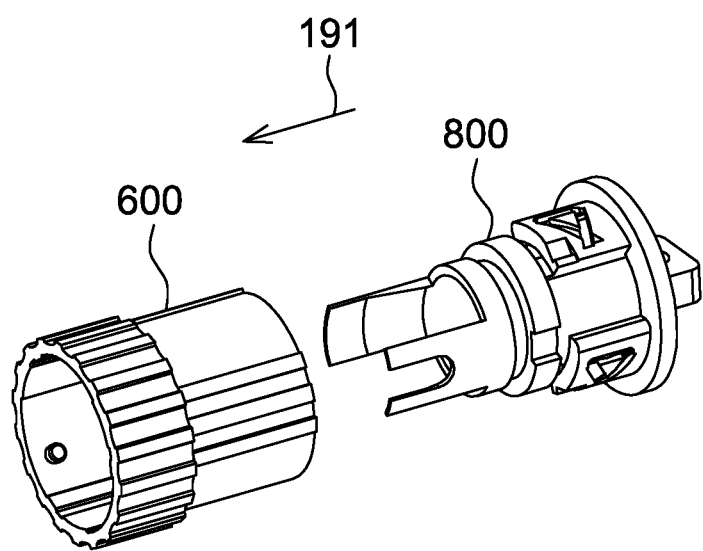
FIG. 23 is an exploded view of the dust protector of the present invention.

The present invention further provides a dust protector for an optical fiber connector. As shown in FIG. 23, the dust protector of the present invention includes a plug housing 600 and a dust cap 800. The plug housing 600 of FIG. 23 has a structure the same as that of the plug housing 600 disclosed in FIGS. 8a to 8d, and therefore will not be further described.

Figure 24A:
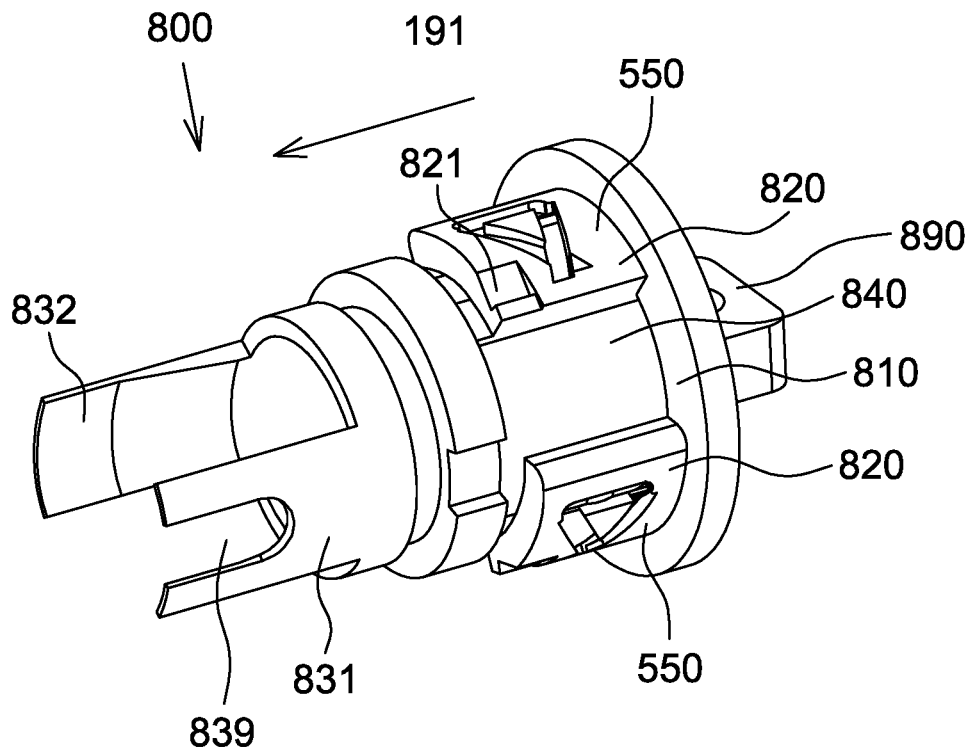
FIGS. 24a to 24c are different elevated perspective views of the dust cap of the dust protector of the present invention.
Figure 24B:
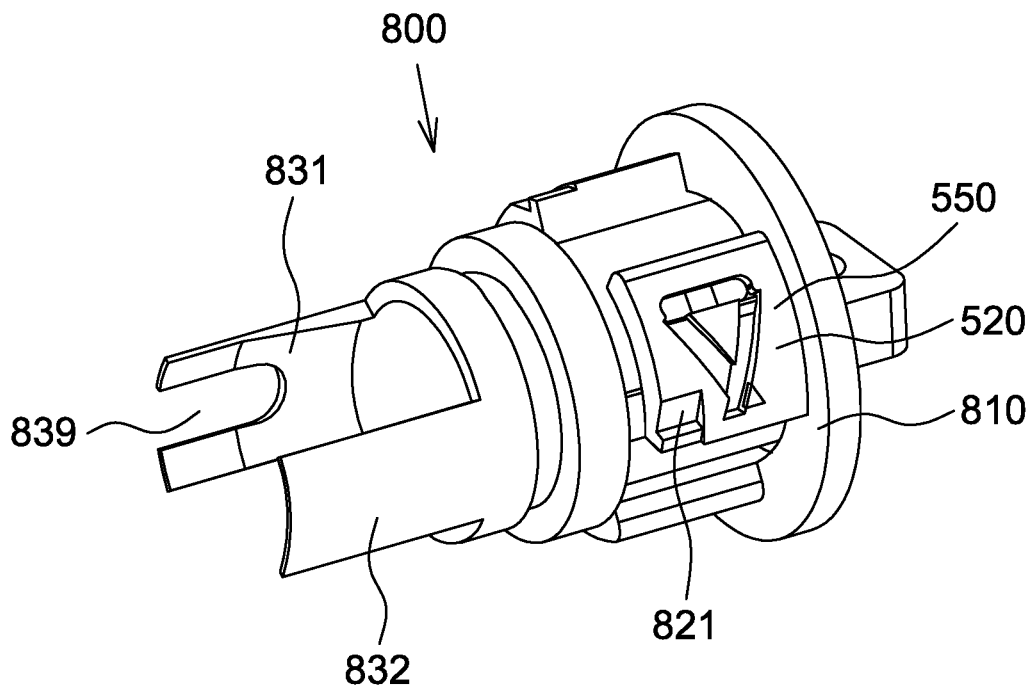
Figure 24C:
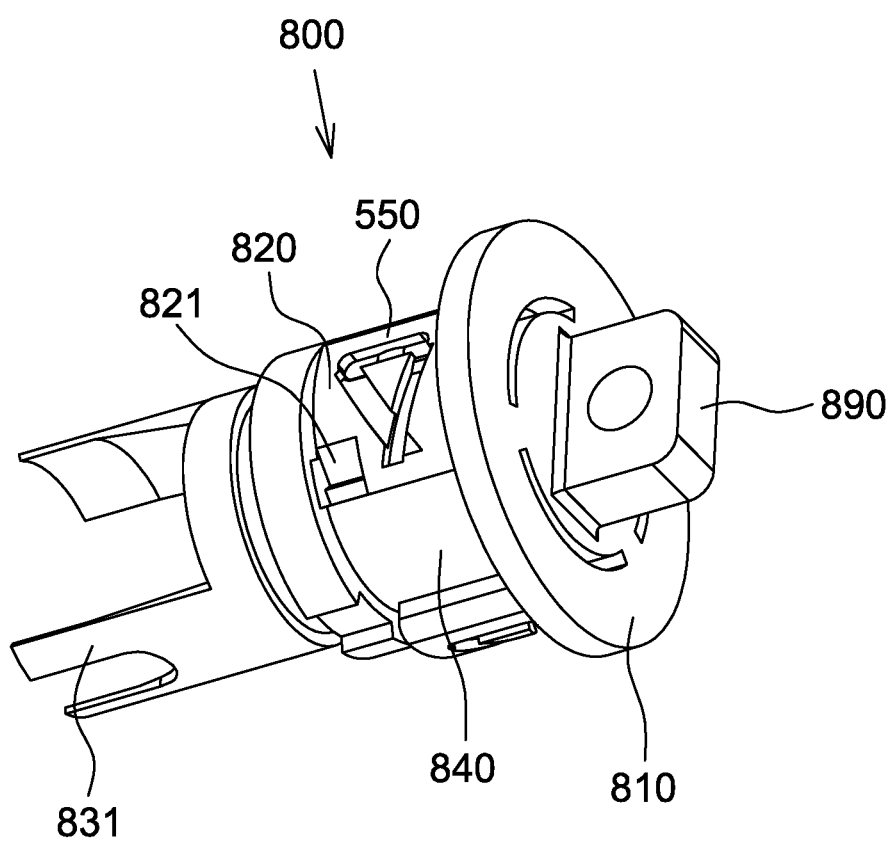

Referring to FIGS. 24a to 24c, the dust cap 800 includes a circular end wall 810 having a handle 890 formed on the rear surface and a closed annular side wall 840 extending perpendicularly from the front surface in the longitudinal direction 191. Thus, the end wall 810 and the annular side wall 840 collectively define an accommodation room. One or more equally spaced highlands 820 are formed on the outer surface of the side wall 840. Two fork portions 831, 832 extend from the front end of the side wall 840 in the longitudinal direction 191. The two fork portions 831, 832 are disposed to face each other. A notch 839 is formed in the front end of the fork portion 831. A lock dent 821 is formed on the left front corner of each of the highlands 820. The bottom of the lock dent 821 is inclined with respect to the top surface of the highland 520 and downward toward the left side. A wall is formed on the left side of the lock dent 821 and a gap is formed on the front side of the lock dent 821. In addition, a guiding groove 550 is formed on each of the highlands 820. The guiding grooves 550 respectively have a structure the same as that of the guiding grooves 500 disclosed in FIGS. 7a to 7g, and therefore will not be further described.

Figure 25:
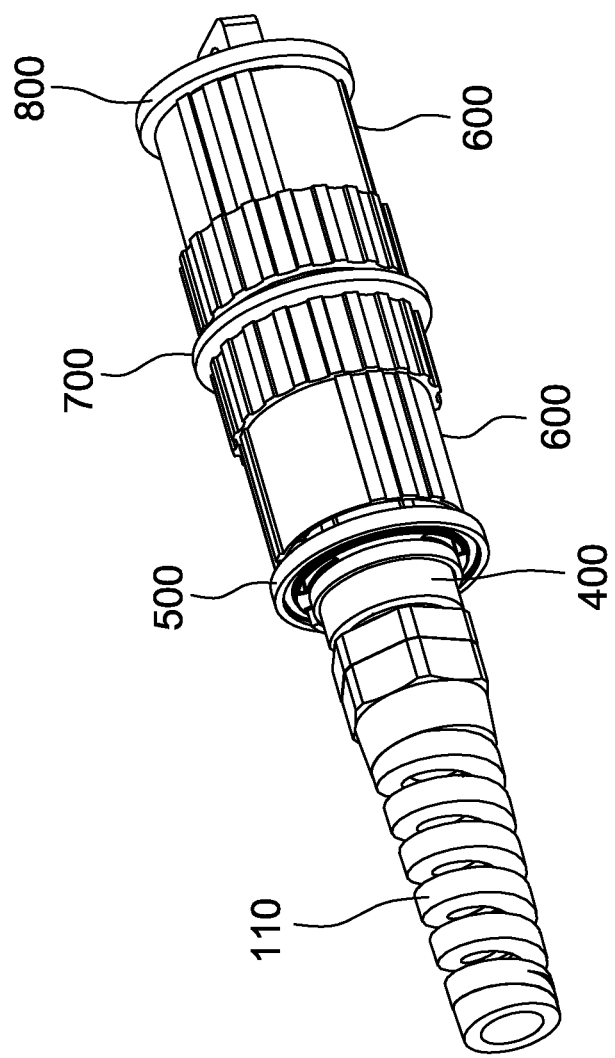
FIG. 25 illustrates the dust protector of the present invention used to protect the connector system of the present invention.

The dust protector of the present invention may be used to shield the connector system 1000 of FIG. 17 to protect the connectors 900 therein from dust. More specifically, referring to FIG. 25, the plug housing 600 and dust cap 800 included in the dust protector may be mounted at one end of the receptacle 700 to shield the optical fiber connectors already inserted into the other end of the receptacle 700. This may protect the inserted optical fiber connectors from dust.

When the pins 642 of the plug housing 600 are respectively located in the first grooves 560 of the dust cap 800, the pins 641 are respectively located in the front sections 751 of the grooves 750, and the lock protrusions 643 are respectively positioned in the lock dents 821. The dust cap 800 is then pulled backward to cause the pins 642 to respectively slide in the first grooves 560 and pass over the bumps 593 to move to the junctions of the first grooves 560 and the third grooves 580. At this status the lock protrusions 643 will respectively move out the lock dents 821 from the front ends of the lock dents 821. The plug housing 600 is then turned to cause the pins 641 to slide from the front sections 751 through the middle sections 752 to the rear sections 753 of the grooves 750, respectively. Since the dust cap 800 fails to be turned with respect to the receptacle 700 and could move only in the longitudinal direction 191, the pins 642 will respectively slide from the first grooves 560 into the third grooves 580 when the plug housing 600 is turned. At this moment the dust cap 800 could be pulled backward to cause the pins 641 to move out the grooves 750, respectively thereby pulling the dust cap 800 out of the receptacle 700.

Similarly, the steps 576 seated in the guiding grooves 550 on the dust cap 800 may stop the pins 642 from moving to the second grooves 570 from the first grooves 560, respectively and therefore act as stoppers. The walls on the left sides of the lock dents 821 may stop the lock protrusions 643 from moving out of the lock dents 821, respectively. Therefore, these walls may also stop the pins 642 from moving to the second grooves 570 from the first grooves 560, respectively. The steps 585 in the guiding grooves 550 may stop the pins 642 from moving to the third grooves 580 from the second grooves 570, respectively and therefore act as stoppers.

When a user turns the plug housing 600 to cause the pins 642 to pass over the bumps 575, respectively, the user will feel a change in resistance. This change in resistance generates a tactile feedback to allow the user to perceive that the pins 642 have moved to the first grooves 560 from the second grooves 570, respectively and the dust cap 800 is in place. The bumps 593 seated in the first grooves 560 may cause a change in resistance when the pins 642 respectively pass over. This change in resistance generates a tactile feedback to allow the user to perceive that the dust cap 800 will be pulled out. Further, the bumps 593 may also prevent the pins 642 from inadvertently slipping over to cause the dust cap 800 to come off. The projections 591 and 592 are to prevent the pins 642 from staying at the respective corners of the guiding grooves 550 and ensure that the pins 642 could be moved when the plug housing 500 is turned. The steps 576, 585 seated in the guiding grooves 550 allow the pins 642 to move only in the counterclockwise direction within the guiding grooves 550 respectively.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A connector system, comprising:
   a receptacle including a tab extending from a rear end thereof, wherein a dent is formed on the receptacle and extends to the tab to act as a complementary indicia;
   a shroud;
   a crimp housing disposed in the shroud for receiving a rear end of a connector; and
   a first fork portion and a second fork portion, each extending from one of the shroud and the crimp housing in a longitudinal direction, wherein
   the first and second fork portions are disposed opposite to each other and configured to be inserted into the receptacle, and
   an alignment indicia is formed on the first fork portion.

2. The connector system as claimed in claim 1, wherein the alignment indicia is a notch formed in the first fork portion.

3. The connector system as claimed in claim 2, wherein the notch divides the first fork portion into a first partial fork portion and a second partial fork portion, the first partial fork portion being longer than the second partial fork portion in the longitudinal direction.

4. The connector system as claimed in claim 3, wherein a dent is formed in a corner of a front end of the second fork portion.

5. The connector system as claimed in claim 1, further comprising:
   a floating block disposed in the crimp housing, the floating block having a passage formed therein for receiving the rear end of the connector,
   wherein the floating block is capable of make limited three-dimensional movement with respect to the crimp housing.

6. The connector system as claimed in claim 1, wherein a groove is formed on an outer surface of the receptacle, the connector system further comprising:
   a plug housing disposed around the shroud, the plug housing including a pin formed on an inner surface thereof to move in the groove.

7. The connector system as claimed in claim 1, further comprising:
   an O-ring disposed around the shroud; and
   a plug housing disposed around the shroud, the plug housing including a shoulder formed on an inner surface thereof to abut against the O-ring.

8. The connector system as claimed in claim 6, further comprising:
   a cable tie fastened around the shroud to prevent the plug housing from moving out and away from the shroud.

9. A connector system, comprising:
   a shroud;
   a connector having a rear end;
   a crimp housing disposed in the shroud to receive the rear end of the connector; and
   a first fork portion and a second fork portion, each extending from one of the shroud and the crimp housing in a longitudinal direction, wherein
   the first and second fork portions are disposed opposite to each other,
   a notch is formed on the first fork portion, the notch divides the first fork portion into a first partial fork portion and a second partial fork portion, and the first partial fork portion is longer than the second partial fork portion in the longitudinal direction, and
   a dent is formed in a corner of a front end of the second fork portion.

10. The connector system as claimed in claim 9, further comprising:
    a floating block disposed in the crimp housing, the floating block having a passage formed therein to receive the rear end of the connector,
    wherein the floating block is capable of make limited three-dimensional movement with respect to the crimp housing.

11. The connector system as claimed in claim 9, further comprising:
    an O-ring disposed around the shroud; and
    a plug housing disposed around the shroud, the plug housing including a shoulder formed on an inner surface thereof to abut against the O-ring.

12. The connector system as claimed in claim 9, further comprising:
    a plug housing disposed around the shroud, and
    a cable tie fastened around the shroud to prevent the plug housing from moving out and away from the shroud.

13. A connector system, comprising:
    a receptacle having opposing first and second ends;
    a first shroud;
    a first crimp housing disposed in the first shroud for receiving a rear end of a first connector;
    a first fork portion extending from one of the first shroud and the first crimp housing in a longitudinal direction, the first fork portion being inserted into the receptacle from the first end, wherein a notch is formed on the first fork portion to divide the first fork portion into a first partial fork portion and a second partial fork portion;
    a second shroud;

a second crimp housing disposed in the second shroud for receiving a rear end of a second connector; and a second fork portion inserted into the receptacle from the second end, the second fork portion extending from one of the second shroud and the second crimp housing toward the first fork portion, wherein a dent is formed in a corner of a front end of the second fork portion to receive a front end of the first partial fork portion of the first fork portion.

14. The connector system as claimed in claim 13, wherein the receptacle includes a tab extending from the first end thereof, a dent being formed on the receptacle and extending to the tab.

15. The connector system as claimed in claim 13, further comprising:
- a floating block disposed in the first crimp housing, the floating block having a passage formed therein for receiving the rear end of the first connector,
- wherein the floating block is capable of making limited three-dimensional movement with respect to the first crimp housing.

16. The connector system as claimed in claim 13, wherein a groove is formed on an outer surface of the receptacle, the connector system further comprising:
- a plug housing disposed around the first shroud, the plug housing including a pin formed on an inner surface thereof to move in the groove.

17. The connector system as claimed in claim 13, further comprising:
- an O-ring disposed around the first shroud; and
- a plug housing disposed around the first shroud, the plug housing including a shoulder formed on an inner surface thereof to abut against the O-ring.

18. The connector system as claimed in claim 16, further comprising:
- a cable tie fastened around the first shroud to prevent the plug housing from moving out and away from the first shroud.

* * * * *